(12) United States Patent
Frazier et al.

(10) Patent No.: US 7,808,718 B2
(45) Date of Patent: Oct. 5, 2010

(54) AFOCAL GALILEAN ATTACHMENT LENS WITH HIGH PUPIL MAGNIFICATION

(75) Inventors: James A. Frazier, Wingham (AU); J. Brian Caldwell, Petersburg, VA (US)

(73) Assignee: FM-Assets Pty Ltd, Sydney (AU)

( * ) Notice: Subject to any disclaimer, the term of this patent is extended or adjusted under 35 U.S.C. 154(b) by 0 days.

(21) Appl. No.: 12/387,001

(22) Filed: Apr. 27, 2009

(65) Prior Publication Data

US 2009/0237810 A1  Sep. 24, 2009

Related U.S. Application Data

(63) Continuation-in-part of application No. 12/063,523, filed as application No. PCT/AU2006/001137 on Aug. 10, 2006.

(51) Int. Cl.
*G02B 15/06* (2006.01)
*G02B 13/00* (2006.01)

(52) U.S. Cl. ........................... 359/673; 359/744
(58) Field of Classification Search ......... 359/672–675, 359/744
See application file for complete search history.

(56) References Cited

U.S. PATENT DOCUMENTS

| | | | | |
|---|---|---|---|---|
| 4,171,872 A | * | 10/1979 | Baker | ........................ 359/744 |
| 4,496,223 A | * | 1/1985 | Baker | ........................ 359/715 |
| 4,802,717 A | | 2/1989 | Kebo | |
| 5,329,402 A | | 7/1994 | Sato | |
| 6,057,971 A | | 5/2000 | Mihara | |
| 6,307,683 B1 | | 10/2001 | Miyano | |

FOREIGN PATENT DOCUMENTS

EP  198394  10/2008

* cited by examiner

*Primary Examiner*—Scott J Sugarman
(74) *Attorney, Agent, or Firm*—Opticus IP Law PLLC

(57) ABSTRACT

An afocal Galilean attachment lens is disclosed, with the lens comprising, along an optical axis, a first lens group with overall negative optical power and a second lens group with overall positive power. The first and second lens groups are arranged to define a Galilean configuration. The lens also has exit and an entrance pupils with respective diameters $D_{EX}$ and $D_{EN}$ that define a pupil magnification $PM=D_{EX}/D_{EN}>4$ and in some embodiments $PM>10$. The afocal Galilean attachment lens also has a length parameter defined $LP>200$ and in some embodiments $LP>700$. The extreme length of the afocal Galilean attachment allows for photographing or filming objects that are remote or otherwise hard to photograph while also providing a relatively large depth of field.

20 Claims, 28 Drawing Sheets

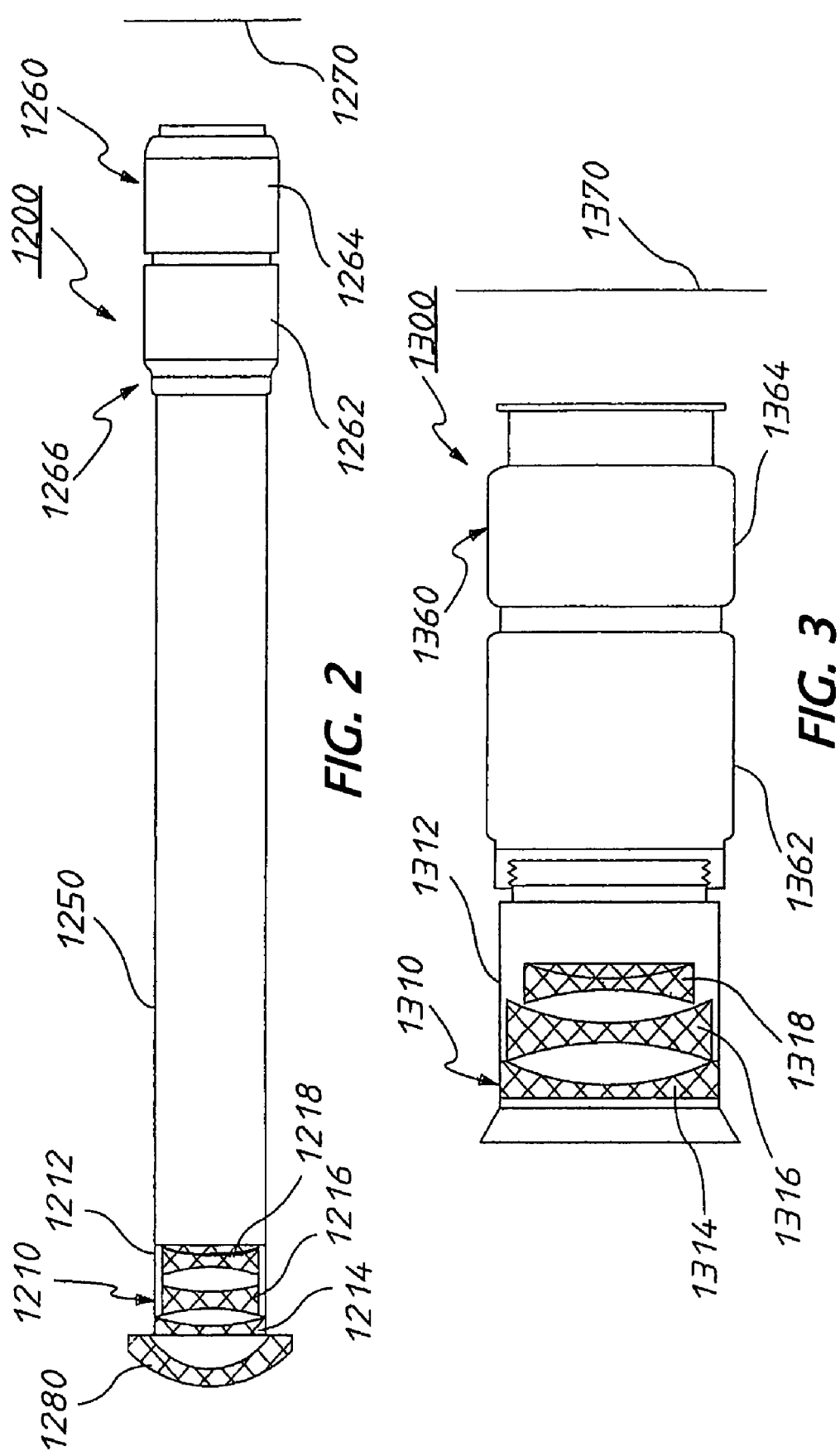

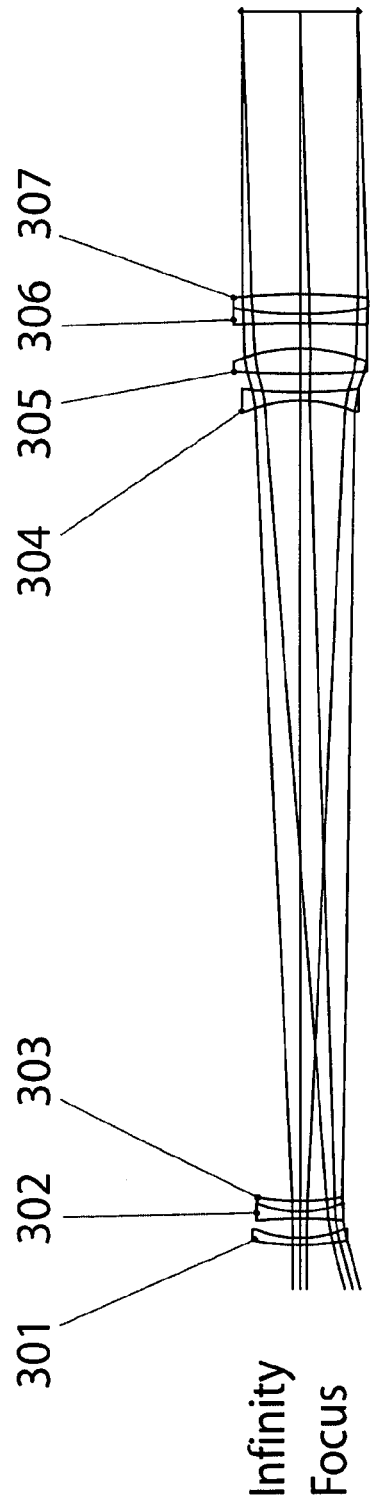
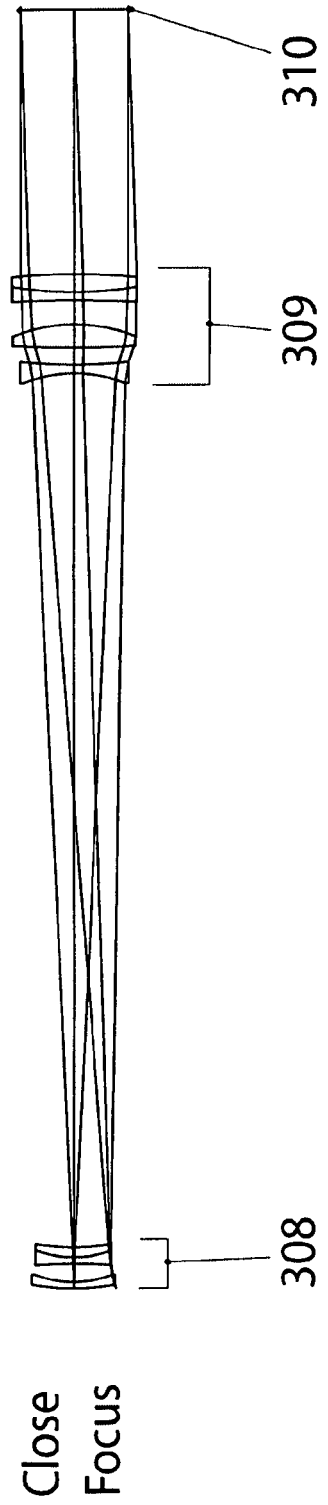
FIG. 16
FIG. 17

AFOCAL GALILEAN ATTACHMENT LENS WITH HIGH PUPIL MAGNIFICATION

REFERENCE TO RELATED APPLICATIONS

This application is a continuation-in-part of and claims priority from U.S. patent application Ser. No. 12/063,523, entitled "Optical Lens System," having a filing date of Jul. 21, 2008, which application is incorporated by reference herein, and which claims priority from PCT Patent Application Serial No. PCT/AU2006/001137, filed on Aug. 10, 2006, which PCT application is incorporated by reference herein.

BACKGROUND ART

1. Field of the Invention

The present invention relates generally to optical systems for still or motion picture cameras including digital cameras, video cameras, more particularly to afocal attachment lenses, and more particularly to particular to afocal Galilean-type attachment lenses having a high pupil magnification.

2. Technical Background

U.S. Pat. No. 5,727,236 that issued to Frazier on Mar. 10, 1998, describes an optical system that has the features of a wide angle lens, a deep field lens and a close focusing lens. The optical system aims to achieve a deep focus image, i.e. to make it possible to film macro subjects in focus in the foreground, while holding infinity also in focus. The system of U.S. Pat. No. 5,727,236 comprises an objective lens, a field lens and a relay lens aligned sequentially on an optical axis and arranged in a lens cylinder or barrel. The objective lens forms an intermediate image at or near the field lens, either in front or in back of the field lens.

The objective lens may be fixed at infinity focus and have a wide open aperture for forming the intermediate image of a larger size than is otherwise normal for an objective lens of that focal length. The field lens and relay lenses transmit that same image to a smaller final image at a film plane. The relay lens is a macro lens and may have an iris and focusing mechanism, so that the objective and field lenses are not required to be used for aperture control and focusing. A Pechan prism, a roof prism, and a mirror for inverting and reversing (reverting) the intermediate image are provided in the barrel between the field and relay lenses. The Pechan prism, the roof prism, and the mirror ensure that the final image at the film plane has the normal orientation of the final image (instead of being inverted and reversed). Such an optical system requires a substantial amount of light to provide good depth of field. Also, the optical system has a substantial number of optical surfaces (i.e., air to optical media surfaces). Every time a light ray has to travel from air to glass to air again, there is some degradation of the image. There may be as many as 50 air-to-glass surfaces in such an optical system.

Further, the Pechan prism or its optical equivalent and the roof prism are bulky and heavy making the optical system larger and heavier than otherwise would be the case Snorkel-type lenses have been used for some time, but all types have necessitated alteration of the camera setup and separately attach the lens systems directly to the camera body. Snorkel lenses allow access to difficult to photograph situations, including table-top photography or ground-level access photography. The depth of field is basically the same as with normal lenses.

Disadvantageously, such lenses require removal of a zoom lens from the camera. Further this requires time to set up the camera. Still further, such snorkel-type lenses require higher light levels and consequently have greater lighting costs.

Double-axis swivel optical lens systems with image rotators have been used to deal with the placement and filming of difficult situations. The image rotator corrects image orientation to correct camera geometry, even if the camera is upside down or sideways oriented. The swivel tip of the optical lens system allows low, ground level shots to be easily accessed by keeping the camera off the ground, or either underslung or overhead shots, while the camera remains in a horizontal orientation.

Disadvantageously, however, such double-axis swivel optical lens systems are expensive to produce because such systems have a large number of lens elements and prisms. Typically, such systems have up to 15 or so objective lenses for handling different angles of acceptance. Further, such optical lens systems place a zoom lens on the front of the system. The various lenses add a significant amount of weight to the front end of a camera to which the lenses are attached and extend the overall length, with the swivels being too far back. This makes the optical lens system and camera awkward to use. Therefore, such lenses are difficult to manufacture economically and are cumbersome to use. Further, a large amount of light is required to operate such lenses. Typically, the optical lens system has an F stop of F 5.6 or smaller (e.g., F 8).

SUMMARY OF THE INVENTION

A first aspect of the invention is an afocal Galilean attachment lens. The lens includes, along an optical axis in order from an object side to an image side, a first lens group with overall negative optical power and a second lens group with overall positive power, and arranged relative to the first lens group to define a Galilean configuration. The lens also includes exit and an entrance pupils having respective diameters $D_{EX}$ and $D_{EN}$ that define a pupil magnification $PM=D_{EX}/D_{EN}>4$.

Another aspect of the invention is the afocal Galilean attachment as described briefly above, wherein $PM \geq 6$, more preferably $PM \geq 8$ and even more preferably $PM \geq 10$.

Another aspect of the invention is the afocal Galilean attachment as described briefly above, wherein the first lens group has a first surface and the second lens group has a last surface. A vertex length VL is defined by the axial distance between the first and last surface. An off-axis ray that enters the system at an angle of 1° from the optical axis and that intersects the front surface at a height H1 from the optical axis intersects the last surface SL at the optical axis, and in combination with the vertex length VL defined a length parameter LP is defined as $LP=|VL/H1|>200$, more preferably $LP>300$, more preferably $LP>500$ and even more preferably $LP>700$.

Another aspect of the invention is an imaging system that includes a camera having a prime lens, with the afocal attachment of the present invention operably coupled to the prime lens.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

FIG. 2 is a side elevation view of a wide-angle, deep-field, close-focusing optical system in accordance with another embodiment of the invention, including a partial cross-sectional view a negative lens unit;

FIG. 3 is a side elevation view of a wide-angle, deep-field, close-focusing optical system in accordance with a further embodiment of the invention, including a partial cross-sectional view a negative lens unit;

FIG. 16 and FIG. 17 are schematic diagrams of a third example (Example 3) of the afocal attachment of the present invention for infinity focus and close focus, respectively;

In the description below, like reference numbers are used to reference the same or like elements.

DETAILED DESCRIPTION

Figure 1:
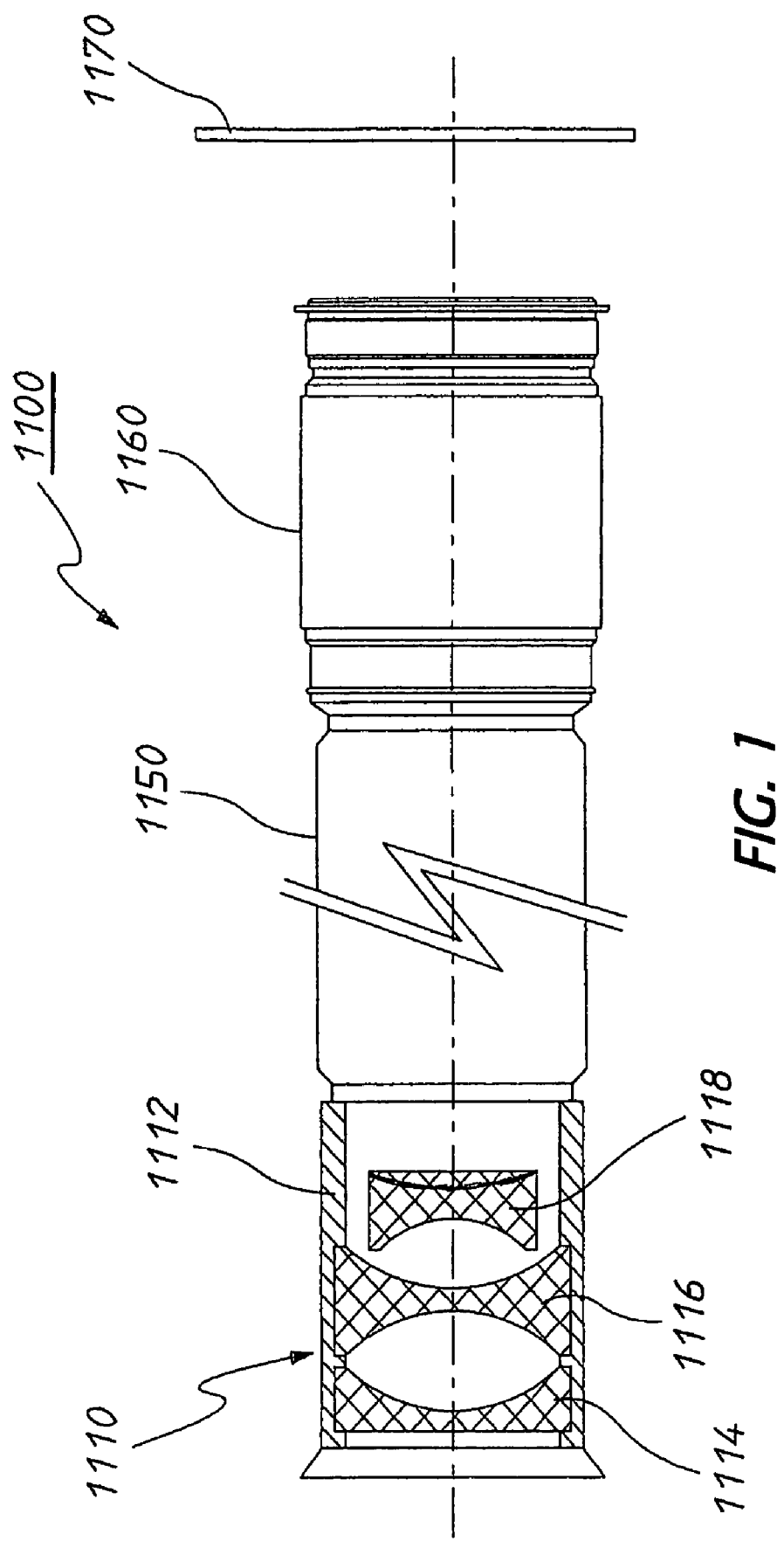
FIG. 1 is a side elevation view of a wide-angle, deep-field, close-focusing optical system in accordance with an embodiment of the invention, including a partial cross-sectional view a negative lens unit.

Reference is now made in detail to the present preferred embodiments of the invention, examples of which are illustrated in the accompanying drawings. Whenever possible, like or similar reference numerals are used throughout the drawings to refer to like or similar parts. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

Wide-angle, deep-field, close-focusing optical systems are disclosed hereinafter. Optical lens attachments and cameras comprising optical lens attachments are also described hereinafter. Still further, double-swivel optical lens system and cameras comprising such double-swivel optical lens systems are described herein after. In the following description, numerous specific details, including particular film formats, lens materials, particular angled prism units, coupling mechanisms, barrel lengths, prism units, and the like are set forth. However, from this disclosure, it will be apparent to those skilled in the art that modifications and/or substitutions may be made without departing from the scope and spirit of the invention. In other circumstances, specific details may be omitted so as not to obscure the invention. Where reference is made in any one or more of the accompanying drawings to features, which have the same or similar reference numerals, those features have for the purposes of this description the same function(s) or operation(s), unless the contrary intention appears. Like features are given like reference numerals in the drawings (e.g. negative lens clusters 1110 and 1210 in FIGS. 1 and 2) for the sake of brevity.

1.1 A Wide-angle, Deep-field, Close-focusing Optical System

FIG. 1 illustrates a wide-angle, deep-field, close-focusing optical system 1100 in accordance with an embodiment of the invention. The optical system 1100 comprises a negative lens unit 11100, an optional lens cylinder 1150 (which may be of any one of various lengths), and a relay lens 1160, which are configured in that sequence. The relay lens 1160 may be a macro lens. The optical system 1100 may be mounted on the front face of a camera (not shown). The camera may be a still or motion picture camera, a video camera, a digital camera, or the like. Behind the (macro) relay lens 1160, a film plane 1170 of the camera is positioned at a distance, so that the final image of the optical system is focused on the film plane 1170. The film plane 1170 symbolically represents the image plane for film in a camera or the charge coupled device ("CCD") of a digital or video camera. The lens barrel 1150 and the relay lens 1160 are depicted as block elements only, since numerous components of these types may be employed without departing from the scope and spirit of the invention. For example, any of a number of standard macro lenses may be used. Further the components of the system 1100 may be tailored to suit the macro lens used. Such components are well known to those skilled in the art. Further, the lens barrel 1150 is depicted using a broken line in its central region to indicate that the barrel 1150 may have any of a number of different lengths, again, without departing from the scope and spirit of the invention. Longer lenses may be preferred. Standard lengths of the lens barrel may include 1 foot (1'), 18 inches, and 2 feet (2'), for example. The length used is determined by factors including the diameter of the negative lens unit's aperture, the power of the (macro) relay lens, and the film or video format used (e.g., a smaller format leads to a longer lens). In an embodiment of the invention, an extremely long optical system can be built. Such a system may comprise a two-foot (2') long tube between a negative lens cluster or lens (acting as an objective lens) and the macro relay lens. The negative lens unit 1110 functions as an objective lens. Negative lenses 1110 of various powers can be used, so there can be a choice of angle of acceptance. The negative lens unit 1110 may be implemented in a variety of ways, provided that the unit remains negative in function. That is, the negative lens unit causes incident parallel light rays to emerge from the negative lens unit as though the light rays emanated from a focal point on the incident side of the negative lens unit. Further, the unit 1110 may comprise both positive and negative lens elements, provided the combination remains negative in overall function. Any positive lens(es) are low power positive lens elements and the overall function of the negative lens unit remains negative.

In the embodiment shown in FIG. 1, the negative lens unit 1110 comprises a negative lens cluster. The negative lens cluster may comprise (from left to right in FIG. 1) a piano-concave lens 1114, a concave-concave lens 1116, and a doublet lens 1118. The doublet lens 1118 may comprise a concave-concave lens bonded with a plano-convex lens. In this embodiment, the negative lens unit 1110 further comprises a barrel housing 1112, which the lenses 1114, 1116, and 1118 are housed in. Both lenses 1114 and 1116 are seated in annular grooves formed in the internal surface of the barrel housing 1112 for a complementary fit.

The optical system 1100 comprises the negative lens unit 1110 as an objective lens and the relay (macro) lens 1160 only. The system 1100 does not require a field lens. The system 1160 also does not require a Pechan prism or its equivalent, a roof prism, or a mirror. The embodiment of the invention utilizes a negative lens cluster or lens, rather than a positive lens. This is contrast to existing systems that use a positive lens, which produces an image that is upside down and requires the use of a mirror and prisms to correct the orientation of the image. Alternatively, this may be done using a series of evenly spaced, positive field or relay lenses. Further, the use of a positive lens in existing systems requires the use of a field lens to magnify the image of the (positive) objective lens. The use of the negative lens unit 1110 as the objective lens simplifies the optical system 1100, since the image focused on by the (macro) relay lens 1160 is already the correct way up.

Because of the size of a negative lens image, a field lens is not required to enlarge the image. The size requirements of the objective negative lens unit 1110 are governed more by the power of the macro relay lens 1160 and the required working distance, the aperture size of the negative lens unit, the power of the macro relay lens, and the film or video format used. If a one-to-one 100 mm macro relay lens gives a working distance of one foot (1'), a one-to-one 200 mm macro relay lens gives a working distance of two feet (2'). For example, a 55 or 60 mm macro relay lens can provide good deep focus. In such an embodiment, the negative lens unit 1110 is close to the macro relay lens 1160. This can be a distinct advantage in embodiments for still photography application, for example, since the negative lens unit 1110 (i.e. acting as an objective lens) can be a simple screw on attachment. In other embodiments of the invention, the macro relay lens 1160 may comprise a zoom lens or zoom lens components. In the embodiments of the invention, there are substantially fewer air-to-glass-to-air surfaces and therefore little or virtually nil image degradation. For example, in an embodiment of the invention, there may only be two or three such air-to-glass-to-air surfaces.

Negative lenses are less wide angle if a positive element is used in tandem. The negative lens unit 1110 may comprise a movable zoom component used in zoom lenses and works very satisfactorily as an objective lens. Negative lens clusters 1110 combine positive and negative lens elements, but remain negative in function.

1.2 Another Wide-angle, Deep-field, Close-focusing Optical System

FIG. 2 illustrates a wide-angle, deep-field, close-focusing optical system 1200 in accordance with another embodiment of the invention. The optical system 1200 comprises a negative lens unit 1210, an optional lens cylinder 1250, and a macro relay lens 1260, again configured in that sequence. The optical system 1200 may be mounted on the front face of a camera (not shown), of the types noted hereinbefore. The negative lens unit 1210 may be implemented in a variety of ways, provided that the unit remains negative in function. That is, the negative lens unit causes incident parallel light rays to emerge from the negative lens unit as though the light rays emanated from a focal point on the incident side of the negative lens unit.

The unit 1210 may comprise both positive and negative lens elements, provided the combination remains negative in overall function. Any positive lens(es) are low power positive lens elements and the overall function of the negative lens unit remains negative. In the embodiment shown in FIG. 2, the negative lens unit 1210 comprises a negative lens cluster. The negative lens cluster may again comprise a plano-concave lens 1214, a concave-concave lens 1216, and a doublet lens 1218. The doublet lens 1218 may comprise a concave-concave lens bonded with a plano-convex lens. These components are housed in a barrel housing 1212.

Behind the macro relay lens 1260, a film plane 1270 of the camera is positioned at a distance, so that the final image of the optical system is focused on the film plane 1270. The system 1200 shown in FIG. 2 is a simple "probe" type deep focus lens that may be used for video and cinematography cameras, including 35 mm, 16 mm, and various video formats.

The negative lens cluster 1210 may be configured the same as that shown in FIG. 1 and may be of the type used in a zoom lens to zoom an image. An optional Aspheron or Aspheron-type attachment 1280 may be used as well. The optional Aspheron or Aspheron-type attachment 1280 can correct linear distortion and can increase the wide angle. The Aspheron-type negative lenses 1280 keep the image linear without gross distortion, as well as increasing the angle of acceptance. Again, the long lens barrel 1250 and the macro relay lens 1260 are depicted as block elements only. In this embodiment of the invention, a long optical system is provided. The macro relay lens 1260 may be a 55, 60, 105 or 200 mm lens. The macro relay lens module may comprise a focus control mechanism 1262 and an aperture control mechanism 1264.

In other embodiments of the invention, the macro relay lens 1260 may comprise a zoom lens or zoom lens components. Optionally, the system 1200 may have a supplementary lens 1266 coupled between the barrel 1250 and the macro relay lens 1260. The supplementary lens 1266 permits a shorter lens barrel to be used. The supplementary lens 1266 can be useful because it cause the macro lens to lose less light than might otherwise be the case.

1.3 Yet Another Wide-angle, Deep-field, Close-focusing Optical System

FIG. 3 illustrates a wide-angle, deep-field, close-focusing optical system 1300 in accordance with still another embodiment of the invention. The optical system 1300 comprises a negative lens unit 1310 and a macro relay lens 1360 configured in that sequence. The negative lens unit 1310 may be implemented in a variety of ways, provided that the unit remains negative in function. That is, the negative lens unit causes incident parallel light rays to emerge from the negative lens unit as though the light rays emanated from a focal point on the incident side of the negative lens unit. The unit 1310 may comprise both positive and negative lens elements, provided the combination remains negative in overall function. Any positive lens(es) are low power positive lens elements and the overall function of the negative lens unit remains negative.

In the embodiment shown in FIG. 3, the negative lens unit 1310 comprises a negative lens cluster. The negative lens cluster may comprise a plano-concave lens 1314, a concave-concave lens 1316, and a doublet lens 1318. The doublet lens 1318 may comprise a concave-concave lens bonded with a plano-convex lens. These components are housed in a barrel housing 1312. The optical system 1300 may be mounted on the front face of a camera (not shown), of the types noted hereinbefore, e.g. a still camera. Behind the macro relay lens 1360, a film plane 1370 of the camera is positioned at a distance, so that the final image of the optical system is focused on the film plane 1370. The system 1300 shown in FIG. 3 may be implemented as an attachment-type deep focus lens for digital and still cameras (e.g. 35 mm).

The negative lens cluster 1310 may be configured the same as that shown in FIG. 1 and may be of the type used in a zoom lens to zoom an image. The negative lens unit 1310 is directly coupled to the macro relay lens (e.g. 55 mm or 60 mm) using a mated, screw-in assembly. In this embodiment, the negative lens unit 1310 has a male screw-in member and the macro relay lens 1360 has a corresponding female screw-in receptacle connected to the focus control 1362. The focus control 1362 and aperture control 1364 are as provided in the macro relay lens. In other embodiments of the invention, the macro relay lens 1360 may comprise a zoom lens or zoom lens components.

1.4 Still Another Wide-angle, Deep-field, Close-focusing Optical System

Figure 4:
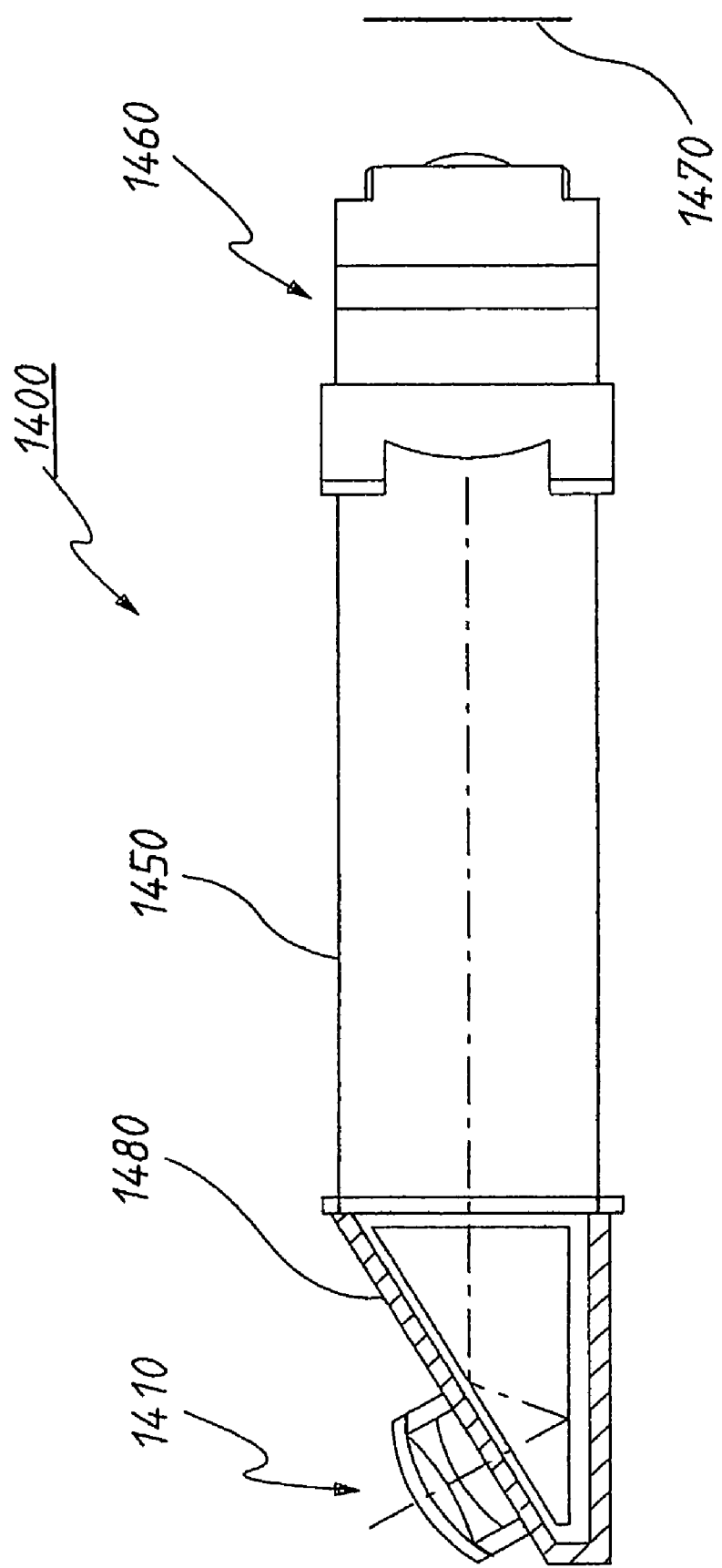
FIG. 4 is a side elevation view of a wide-angle, deep-field, close-focusing optical system in accordance with still a further embodiment of the invention.

FIG. 4 illustrates a wide-angle, deep-field, close-focusing optical system 1400 in accordance with a further embodiment of the invention. The optical system 1400 comprises a negative lens unit 1410, a dispersion prism 1480, a lens barrel 1450, and a macro relay lens 1460 configured in that sequence. The negative lens unit 1410 may be implemented in a variety of ways, provided that the unit remains negative in function. That is, the negative lens unit causes incident parallel light rays to emerge from the negative lens unit as though the light rays emanated from a focal point on the incident side of the negative lens unit. The unit 1410 may comprise both positive and negative lens elements, provided the combination remains negative in overall function. Any positive lens(es) are low power positive lens elements and the overall function of the negative lens unit remains negative. In this embodiment, as shown in FIG. 4, the negative lens unit 1410 comprises a single negative lens.

Alternatively, the negative lens unit may comprise a negative lens cluster as shown in any of FIGS. 1 to 3. In this embodiment, a 60-degree dispersion prism may be practiced. Further, the lens barrel 1450 is rotatably coupled to the macro relay lens 1460, behind which is disposed the film plane 1470. The macro relay lens 1460 comprises aperture and focus control mechanisms (not depicted separately as in FIGS. 2 and 3).

In other embodiments of the invention, the macro relay lens 1460 may comprise a zoom lens or zoom lens components. As shown in FIG. 4, the negative lens unit 1410 is connected to an inclined surface of the prism 1480, so that the unit 1410 is aligned off-axis relative to the central longitudinal axis of the lens barrel 1450. This deviation aspect allows the lens barrel 1450 to be rotated to give the correct camera geometry in certain difficult positions, e.g. from a floor position. Thus, for example, the camera can be sat on the ground to capture images at difficult angles. This allows easy access to difficult perspectives. Rotation of the lens barrel enhances this aspect, permitting easy overhead and underslung shots, for example.

1.5 Yet Another Wide-angle, Deep-field, Close-focusing Optical System

Figure 5:
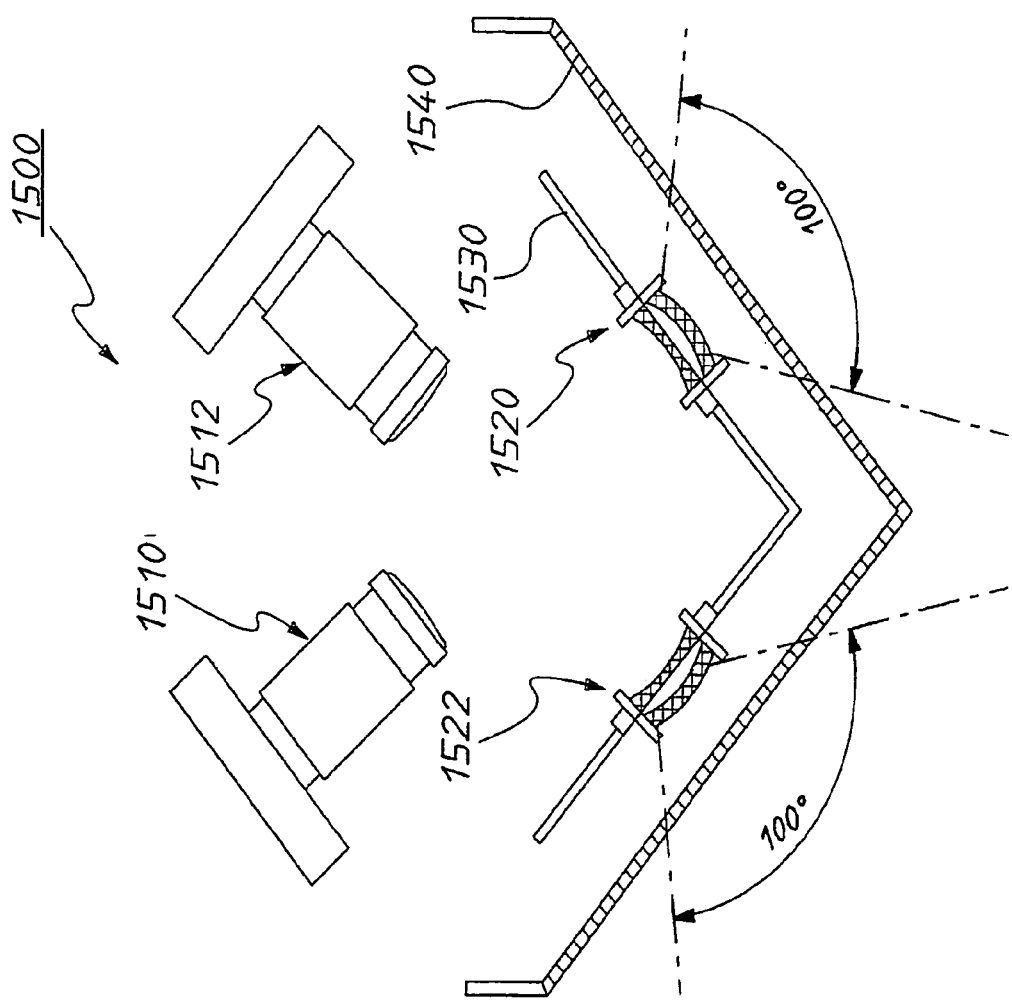
FIG. 5 is a side elevation view of a dual, wide-angle, deep-field, close-focusing optical system in accordance with yet another embodiment of the invention.

FIG. 5 illustrates a dual wide-angle, deep-field, close-focusing optical system 1500 in accordance with a further embodiment of the invention. The dual lens setup 1500 is adapted for use in a fixed size compartment or camera port in an aircraft fuselage (not shown). Two macro relay lenses 1510, 1510, 512 are fixed in position, each one facing and optically aligned with a respective negative lens unit 1520, 1520, 1522. For example, the macro relay lenses 1510, 1510, 1512 may be F 2.8 Micro-Nikon macro relay lenses, providing a F 2.8 capability, which may provide a daytime shutter priority camera setting and a nighttime aperture priority. For example, the negative lens units may be 55 mm negative lens clusters. The macro relay lenses and negative lens units function and may be constructed in the manner hereinbefore described. The negative lens units 1520, 1520, 1522 are each fixed in position relative to the respective macro relay lens 1510, 1510,1512 by a holding frame 1530, which may be made of metal. In this manner, lens barrels are not required. A glass panel 1540 suspended beneath the holding frame 1530 encloses the dual lens setup 1500 within the aircraft fuselage. In this embodiment, each macro relay lens and negative lens unit combination 1510, 1510, 1512 and 1520, 1520, 1522 provides a 100 degree angle of view. The angles of view overlap. With the embodiment of the invention, two 35 mm cameras may be used in place of a 70 mm camera for example. The negative lens units and macro relay lenses may be held on axis in a pin-registered, locating frame. While two negative lens unit and macro relay lens combinations are shown in this embodiment, it will be appreciated by those skilled in the art in the light of this disclosure that other numbers may be practiced including a single negative lens unit and macro relay lens combination. In other embodiments of the invention, the macro relay lenses 1510, 1512 may each comprise a zoom lens or zoom lens components. In the embodiments depicted in FIGS. 1 to 5, the macro relay lens may comprise a movable zoom lens or movable zoom lens components.

The foregoing embodiments of the invention involved less degradation of an image due to fewer components and hence less air-to-glass-to-air degradation. Also the negative lens cluster as objective lens inverts the resulting image to the correct orientation, which permits the embodiments of the invention to do away with mirrors and prisms required by existing systems. In the embodiments of the inventions, different lens lengths can be used, making the lens suitable for different cameras and film formats.

2.0 Overview of Barrel-Lens Attachment

The embodiments of the invention described hereinafter are able to provide massive depth of field. That is the embodiments of the invention provide a wide-angle, deep-field, close-focusing optical system. Some embodiments of the invention negate the need to remove a zoom lens from the camera, by attaching the optical lens attachment to the zoom lens, thereby saving time setting up the camera. Further the embodiments of the invention increase the depth of field, which is useful for table-top macro photography. Still further, the embodiments of the invention are above to do so at greatly reduced light levels, thereby reducing the amount of light required, and thus saving on the cost of lighting.

The partial use of the "telephoto" end of the zoom lens can still be used to alter the field size and angle of acceptance of the subject matter. Partial zoom can be performed and achieved during the shot.

Two forms of optical lens attachment are described hereinafter, namely a straight, forward view unit and an inclined angle (e.g., 60 degrees) view unit. Because of rotation about a main axis, the inclined angle view unit can access difficult lens placement situations. Controls such as focus, aperture and zoom can be carried out on the dedicated lens supplied with the camera.

2.1 A Straight, Forward-View Barrel-Lens Attachment

Figure 6:
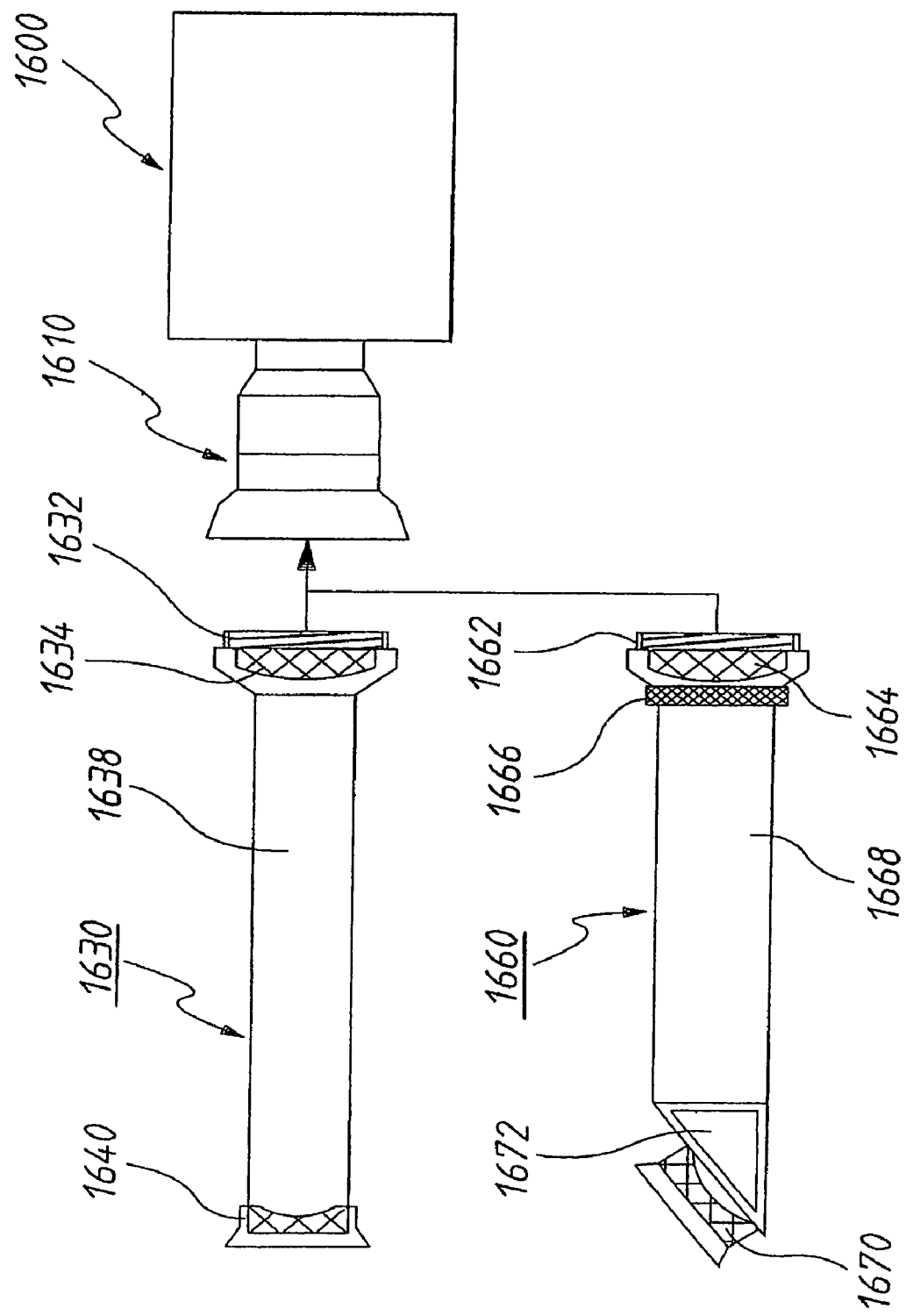
FIG. 6 is a side elevation view of two optical lens attachments in accordance with embodiments of the invention suitable for use with a video or film camera.

FIG. 6 is block diagram illustrating two optical lens attachments 1630, 1660 for use with a camera 1600, e.g. a video camera or film camera. The camera 1600 has a zoom lens 1610 aligned with its optical axis. Examples of such cameras include Sony, JVC, Canon video cameras with zoom lenses, or 16 mm or 35 mm cine film cameras with zoom lenses. One of the optical lens attachments 1630 is a straight-forward view lens attachment in accordance with an embodiment of the invention. This attachment 1630 comprises a coupling mechanism 1632 for mating engagement with the zoom lens 1610 of the camera 1600. As depicted in FIG. 6, the coupling mechanism 1632 itself comprises an externally threaded, cylindrical male member for mating inter-engagement with an internally threaded, cylindrical female member (not shown) of the camera's zoom lens 1610. Other coupling mechanisms may be used without departing from the scope and spirit of the invention. For example, a bayonet-type clip arrangement may be substituted for the threaded male/female coupling mechanism 1632 of FIG. 6, with corresponding adaptation of the zoom lens hood. A lens cylinder or barrel (simply "barrel" hereinafter) 1638 is coupled at one end to the coupling mechanism 1632. For example, the barrel 1638 may have a length between 12 and 18 inches, but other barrel lengths may be practiced without departing from the scope and spirit of the invention.

As shown in FIG. 6, the barrel 1638 is an elongated, cylindrical member and has a smaller diameter than that of the coupling mechanism 1632 for engagement with the zoom lens 1610. Thus, a conical frustrum section with a cylindrical skirt may connect the elongated barrel 1638 to the coupling mechanism 1632. Obviously, if the coupling mechanism 1632 and the barrel 1638 are the same or substantially the same diameter, the conical frustrum section and skirt may be omitted. For the purposes of discussion, the conical frustrum section and skirt are considered as part of the coupling mechanism hereinafter, since the employment of these parts is dependent upon the requirements for the coupling mechanism 1632.

A supplementary lens, which is a close-up lens or diopter 1634 (simply "diopter" or "diopter lens" hereinafter), is disposed between the barrel 1638 and the coupling mechanism 1632 in this embodiment. The diopter 1634 focuses the zoom lens on a negative lens unit 1640, described hereinafter. As the diopter 1634 is of larger diameter than the barrel 1638 but small diameter than the coupling mechanism 1632, the diopter 1634 is housed in the conical frustum section and skirt in this embodiment. However, variations to the location and housing of the diopter 1634 may be practiced without departing from the scope and spirit of the invention.

The negative lens unit 1640 is coupled to the other end of the elongated barrel 1638. Any of a number of negative lens elements and/or negative lens clusters well known to those skilled in the art may be implemented without departing from the scope and spirit of the invention.

Optionally, the attachment 1630 may also have a lens hood (as shown in FIG. 6) to protect the negative lens unit 1640 at that end of the barrel 1638. The coupling mechanism 1632, the diopter 1634, the elongated barrel 1638, and the negative lens unit 1640 are all concentrically aligned with the optical axis of the camera 1610. Thus, the optical lens attachment 1630 according to this embodiment forms a straight, forward-view barrel-lens attachment. The negative lens unit 1640 causes incident parallel light rays to emerge from the negative lens unit as though the light rays emanated from a focal point on the incident side of the negative lens unit. The unit may comprise both positive and negative lens elements, provided the combination remains negative in overall function. Any positive lens(es) are low power positive lens elements and the overall function of the negative lens unit remains negative.

2.2 An Angled-View Barrel-Lens Attachment

The other optical lens attachment 1660 of FIG. 6 is an angled-view lens attachment in accordance with a further embodiment of the invention. This attachment 1660 also comprises a coupling mechanism 1662 for mating engagement with the zoom lens 1610 of the camera 1600. This coupling mechanism 1662 can be of the same structure and configuration as that of coupling mechanism 1632, and suitable variations and substitutions may be made thereto as described with reference to the coupling mechanism 1632. A barrel 1668 can be coupled at one end directly (not shown) to the coupling mechanism 1662.

Again, for example, the barrel 1668 may have a length between 12 and 18 inches, but other barrel lengths may be practiced without departing from the scope and spirit of the invention. However, the barrel 1668 may be coupled to the coupling mechanism 1662 by a rotation mechanism 1666, which allows the barrel 1668 to be rotated 360 degrees as described in greater detail hereinafter. The rotation mechanism 1666 may comprise a rotating ring assembly permitting 360 degree rotation of the elongated barrel. Again, as shown in FIG. 6, the barrel 1668 has a smaller diameter than that of the coupling mechanism 162 for engagement with the zoom lens 1610. Thus, a conical frustrum section with a cylindrical skirt may connect the elongated barrel 1668 or the rotation mechanism 1666 to the coupling mechanism 1662. A diopter 1664 is disposed between the barrel 1668 and the coupling mechanism 1662 in this embodiment. The diopter 1664 focuses the zoom lens on a negative lens unit 1640, described hereinafter.

An inclining prism member 1672 is coupled to the other end of the elongated barrel 1668. In the embodiment shown in FIG. 6, this prism member 1672 is a 60 degree inclining prism, but other angled prisms may be practiced without departing from the scope and spirit of the invention. A negative lens unit 1670 is located on the inclined surface of the prism 1672 relative to the longitudinal axis of the barrel 1668. Again, any of a number of negative lens elements and/or negative lens clusters well known to those skilled in the art may be implemented without departing from the scope and spirit of the invention.

Also, the attachment 1660 may also have a lens hood (as shown in FIG. 6) to protect the negative lens unit 1670 at that end of the barrel 1668. The rotation mechanism 1666 allows inclining prism 1672 and hence the negative lens unit 1670 to be rotated by up to 360 degrees. Thus, the optical lens attachment 1630 according to this embodiment forms an angled-view barrel-lens attachment.

The negative lens unit causes incident parallel light rays to emerge from the negative lens unit as though the light rays emanated from a focal point on the incident side of the negative lens unit. The unit may comprise both positive and negative lens elements, provided the combination remains negative in overall function. Any positive lens(es) are low power positive lens elements and the overall function of the negative lens unit remains negative.

2.3 Another Angled-View Barrel-Lens Attachment.

Figure 7:
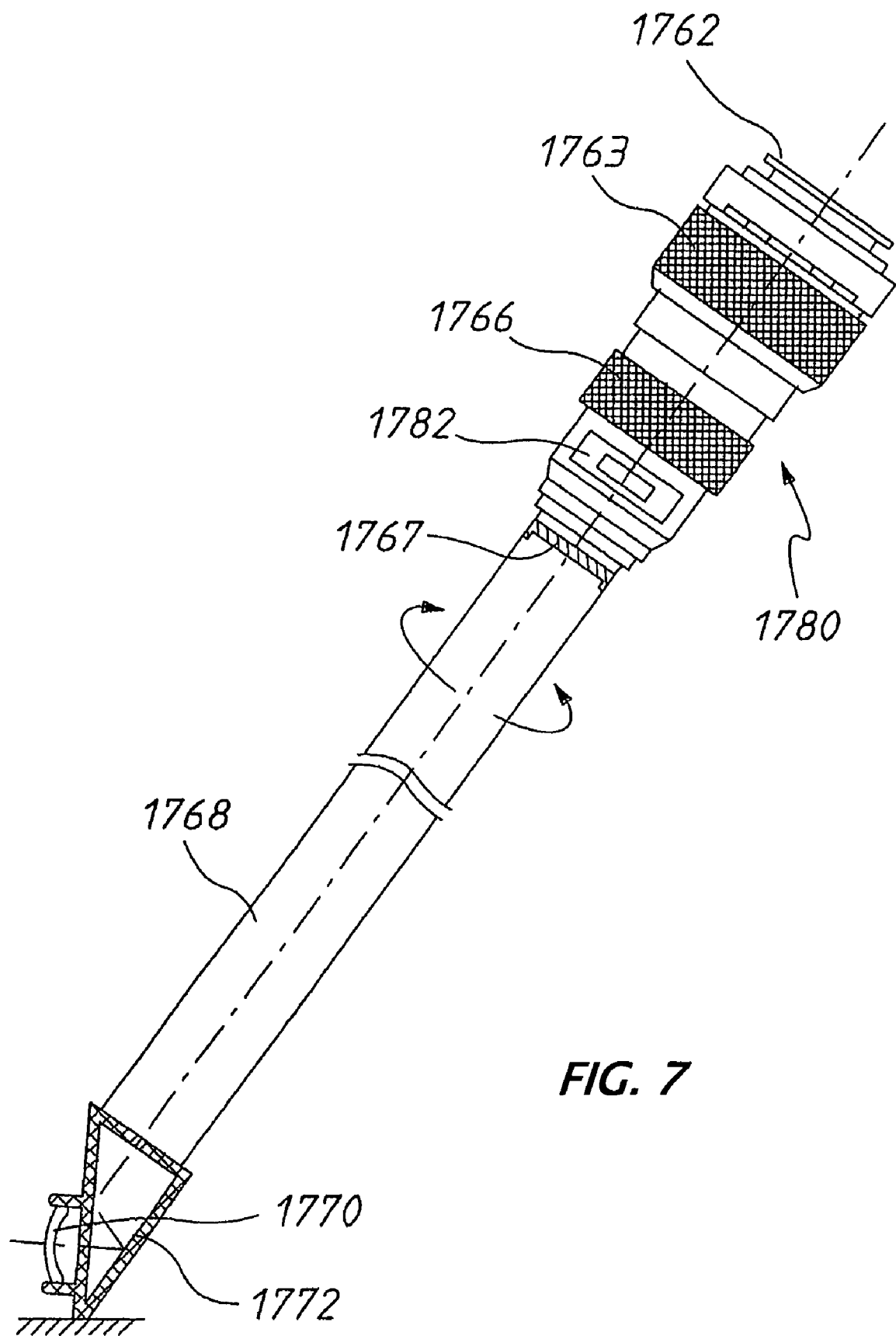
FIG. 7 is a side elevation view of an optical lens attachment in accordance with yet another embodiment of the invention suitable for use with a video or film camera.

Still another optical lens attachment 1760 is shown in FIG. 7 comprising an angled-view lens attachment in accordance with a further embodiment of the invention. This attachment C360 comprises a coupling mechanism 1762 for mating engagement with a camera (not shown). This coupling mechanism 1762 can be of the same structure and configuration as that of coupling mechanism 1632, and suitable variations and substitutions may be made thereto as described with reference to the coupling mechanism 1632.

Various couplings as with the other embodiments may be used to suit different cameras. A barrel 1768 can be coupled at one end directly (not shown) to a macro lens unit with zoom capability 1780, which for example may be a F2.8 100 mm macro lens. In turn, the macro lens unit with zoom capability 1780 is connected to the coupling mechanism 1762. However, the barrel 1768 may be coupled to the macro lens unit 1780 by a suitable rotation mechanism, which allows the barrel 1768 to be rotated 360 degrees. The macro lens unit with zoom capability 1780 is not a zoom lens with a macro mode. In this embodiment, the macro lens unit with zoom capability 1780 focuses on the negative lens unit 1770. This embodiment has a dedicated macro lens unit.

As shown in FIG. 7, a drop-in filter 1782 can disposed between the barrel 1768 and the macro lens unit with zoom capability 1780 in this embodiment. This may an externally rotatable one-stop polarizer. The macro lens unit 1780 may comprise a focus ring 1766 and a manual zoom control ring 1763, which can have the option to couple to the camera's own zoom control switch. The barrel 1768 may comprise an optical flat as a sealing mechanism 1767 to seal the barrel 1768. Also, the barrel 1768 may be adapted for quickfit attachment to the macro lens unit 1780.

Various barrel lengths may be practiced to suit different formats. For example, there may be one unit for 35 mm film, and another one for other formats. In one embodiment the barrel 1768 and an inclining prism 1772 may be approximately 300 mm in length and waterproof so as to be submersible.

The inclining dispersion prism 1772 is coupled to the other end of the elongated barrel 1768. In this embodiment, the prism member 1772 is a 60 degree inclining prism, but other angled prisms may be practiced without departing from the scope and spirit of the invention. A negative lens unit 1770 is located on the inclined surface of the prism 1772 relative to the longitudinal axis of the barrel 1768. The barrel 1768 and hence the inclining prism 1772 and the negative lens unit 1770 can be rotated by 360 degrees. The negative lens unit 1770 may be an aspheric negative lens.

While the embodiment of FIG. 7 has been described as an inclined angle view unit, it will be appreciated by those skilled in the art that another embodiment can be practiced using a straight, forward view unit like that of FIG. 6. The negative lens unit causes incident parallel light rays to emerge from the negative lens unit as though the light rays emanated from a focal point on the incident side of the negative lens unit. The unit may comprise both positive and negative lens elements, provided the combination remains negative in overall function. Any positive lens(es) are low power positive lens elements and the overall function of the negative lens unit remains negative.

Still further, cameras may be practiced in accordance with embodiments of the invention, which comprise an optical lens attachment as described hereinbefore with a zoom lens of the camera, or an optical lens attachment having a macro lens unit with zoom capability. Examples of such video or film cameras are well known to those skilled in the art.

3.0 Overview of Double-Swivel Optical Lens Systems

The following embodiments of the invention are able to provide massive depth of field, which renders both foreground and background subjects in focus. This is useful for table-top macro photography. Still further, the following embodiments of the invention are able to do so at greatly reduced light levels, thereby reducing the amount of light required, and thus saving on the cost of lighting.

Some embodiments of the invention negate the need to remove a zoom lens or macro lens from a camera, by attaching the double-swivel optical lens attachment to the zoom lens or macro lens, thereby saving time setting up the camera. Some embodiments of the invention simply attach to an existing zoom lens or macro lens of a camera, which enables the elimination of additional optics and their associated costs. The partial use of the "telephoto" end of a zoom lens can still be used to alter the field size and angle of acceptance of the subject matter. Partial zoom can be performed and achieved during the shot.

3.1 Double-Swivel Optical Lens Attachment

Figure 8:
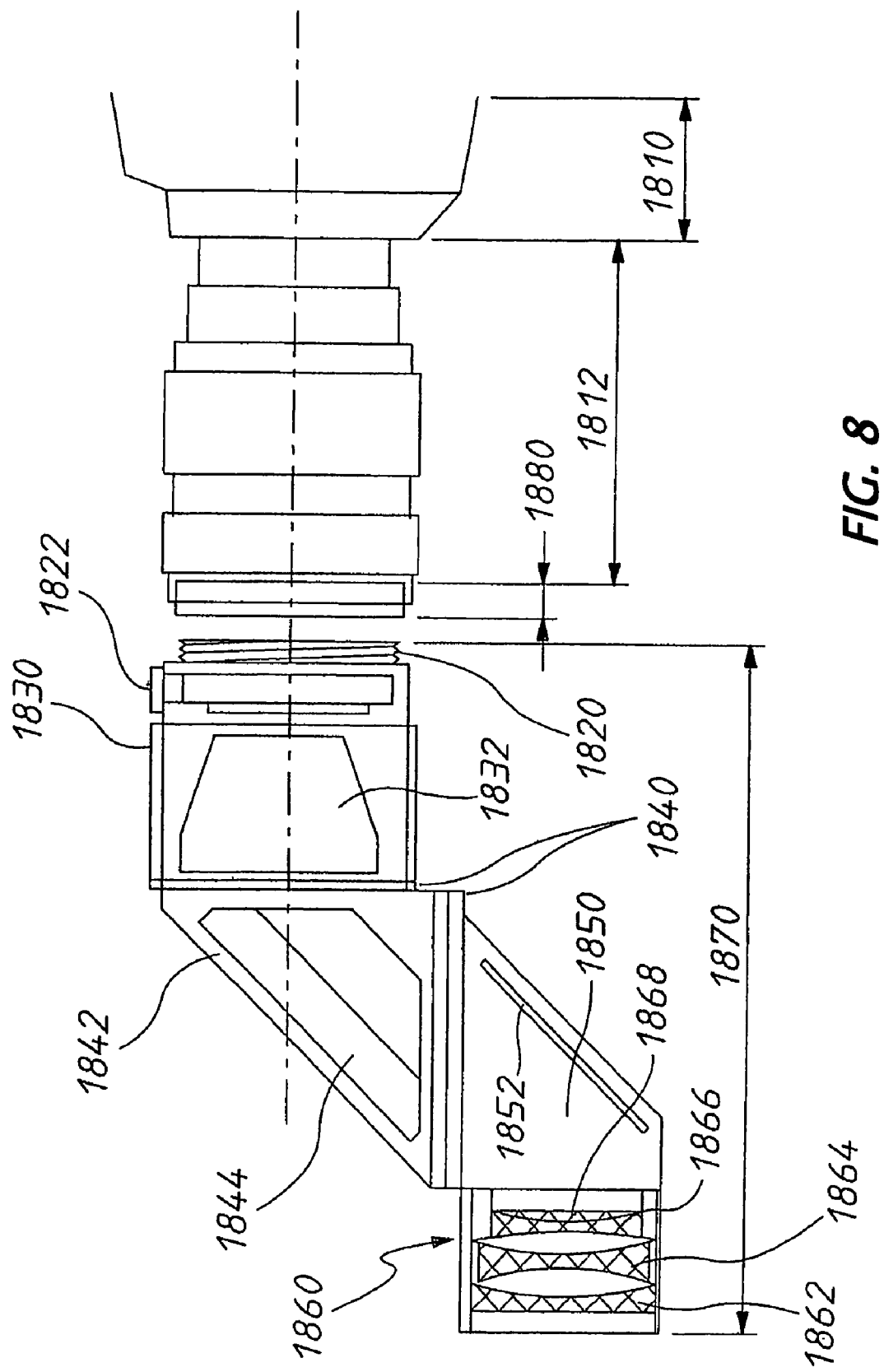
FIG. 8 is a side elevation view of a double-swivel optical lens system in accordance with an embodiment of the invention suitable for use with a video or film camera.

FIG. 8 illustrates an arrangement of 1800 of a double-swivel optical lens system 1870 in accordance with an embodiment of the invention. The attachment 1870 can be used with a camera 1810, e.g. a video camera or a film camera. This system 1870 is practiced as a double-swivel optical lens for a camera 1810 that has a zoom lens or macro lens 1812 attached to the camera 1810, which is aligned with the camera's optical axis. Examples of such cameras include Sony, JVC, Canon video cameras with zoom lenses, or 16 mm or 35 mm cine film cameras with zoom lenses. These are just examples of cameras with which this and other embodiments of the invention may be practiced.

The attachment 1870 comprises a coupling mechanism 1820 for mating engagement with the existing zoom lens or macro lens 1812 of the camera 1810. As shown in FIG. 8, the coupling mechanism 1820 in this embodiment is an externally threaded, male cylindrical member for engagement with an internally threaded, female cylindrical member (not shown) of the zoom lens or macro lens 1812. However, other coupling mechanisms well known to those skilled in the art may be practiced without departing from the scope and spirit of the invention. For example, a bayonet-type clip arrangement may be substituted for the threaded male/female coupling mechanism 1820 of FIG. 8, with corresponding adaptation of the zoom lens or macro lens 1812 of the camera 1810.

The system comprises an existing zoom lens with a close-up, diopter supplementary lens 1880 or a macro lens 1812. The diopter lens 1880 may be mounted in the zoom lens, or coupled to the zoom lens 1812. Other configurations may be implemented provided the diopter lens 1880 is positioned to focus the existing zoom lens 1812 on a negative lens unit 1860, discussed hereinafter. The diopter 1880 focuses the zoom lens 1812 on the virtual image of the negative lens unit 1860. Otherwise, the macro lens 1812 is focused on the negative lens unit. The zoom lens or the macro lens 1812 is a relay lens in the system 1870.

A cylindrical housing 1834 is coupled to the coupling mechanism 1820. Optionally, the cylindrical housing 1834 is adapted at the end adjacent to the coupling mechanism 1820 to receive a drop-in filter system 1822, which is preferably input from the top surface of the housing 1834 as shown in FIG. 8. The cylindrical housing also forms part of an image rotator 1830. Preferably, the image rotator 1830 comprises a Pechan prism 1832 disposed within the image rotator 1830. The Pechan prism 1832 is an optical lens element capable of rotating an image. The image rotator 1830 has rotatable external sleeve coupled to the Pechan prism that can be manually rotated about its longitudinal axis to rotate the image using the Pechan prism 1832. In an alternative embodiment, a dove prism (well known to those skilled in the art) may be practiced instead of a Pechan prism in the image rotator 1830.

A dove prism is a reflective prism shaped from a truncated right-angle prism that can invert an image. The double-swivel attachment 1870 further comprises two rotation mechanisms 1840, which are preferably rotation rings. One rotation ring 1840 couples the image rotator 1830 to an angled (in side elevation) housing 1842, which may be triangular or largely triangular in form. The angled housing 1842 has an amici roof prism 1844 disposed within the housing 1842, The prism 1844 can deviate light by 90° through the angled housing 1842 and invert an image simultaneously.

Thus, the longitudinal optical axis through the image rotator 1830 and the zoom lens (with diopter) or the macro lens 1812, which is horizontal in the drawing, is rotated 90° by the amici roof prism 1844, so that the optical axis is oriented in a vertically downward manner in the drawing.

As shown in FIG. 8, another angled housing 1850 is coupled to the angled housing 1842 via the second rotation ring 1840. In the angled surface 1854 of the angled housing 1850, a front surfaced mirror is 1852 is mounted. The angled housing 1854 is coupled at the surface opposite the mirror 1852 to the negative lens unit 1860. The negative lens unit 1860 functions as an objective lens and is a sealed unit. Any of a number of negative lens elements and/or negative lens clusters well known to those skilled in the art may be implemented in the negative lens unit 1860 without departing from the scope and spirit of the invention. The overall function of the negative lens unit is a negative lens. That is, the negative lens unit causes incident parallel light rays to emerge from the negative lens unit as though the light rays emanated from a focal point on the incident side of the negative lens unit. Some elements of the negative lens unit may be positive lens(es), provided they are low power positive lens elements and the overall function of the negative lens unit 1860 remains negative.

Negative lens elements of various powers can be used in the negative lens unit 1860, so there can be a choice of angles of acceptance. The negative lens unit 1860 may be implemented in a variety of ways, provided that the unit remains negative in function. In the embodiment shown in FIG. 8, the negative lens unit 1860 comprises a negative lens cluster. In FIG. 8, the negative lens unit 1860 comprises (from left to right) a plano-concave lens 1862, a concave-concave lens 1864, and a doublet lens 1866, 1868. The doublet lens 1866, 1868 may comprise a concave-concave lens 1866 bonded with a plano-convex lens 1868.

The negative lens unit 1860 may be an aspheric negative lens. The rotation ring 1840 between the angled housing 1842 and the image rotator 1830 permits the negative lens unit 1860, the angled housing 1854, and the angled housing 1842 to be rotated about the longitudinal axis extending through the image rotator 1830, which is oriented in a horizontal manner in FIG. 8. The other rotation ring 1840 between the angled housing 1842 and the angled housing 1854 permits the angled housing 1854 and the negative lens unit 1860 to be rotated about a vertical axis.

The light rays "emanating" from the focal point on the incident side of the negative lens unit 1860 is reflected 90° (from horizontal to vertical) to the amici roof prism 1844. The prism 1844 rotates the light rays by 90° and inverts the image. The Pechan prism 1832 can be used to rotate the image so that the image is a normal (non-inverted) orientation as is the case at the negative lens unit 1860. In this manner, a correctly oriented image can always be dialed up by adjusting the image rotator 1830. The diopter 1880 focuses the zoom lens 1812 on the image on the incident side of the negative lens unit 1860. The diopter 1880 is not required for focusing the macro lens 1812 on the negative lens unit.

In the foregoing embodiment of the invention, the zoom lens (with diopter) or macro lens 1812 is located behind the attachment 1870, and therefore does not add to the weight on the front end of the attachment 1870. Further the zoom lens 1812 is able adjust the field of view, instead of requiring many expensive objective lenses on the front end of the system 1870. Advantageously, the attachment 1870 remains compact and is much lighter.

3.2 Another Double-Swivel Optical Lens System

Figure 9:
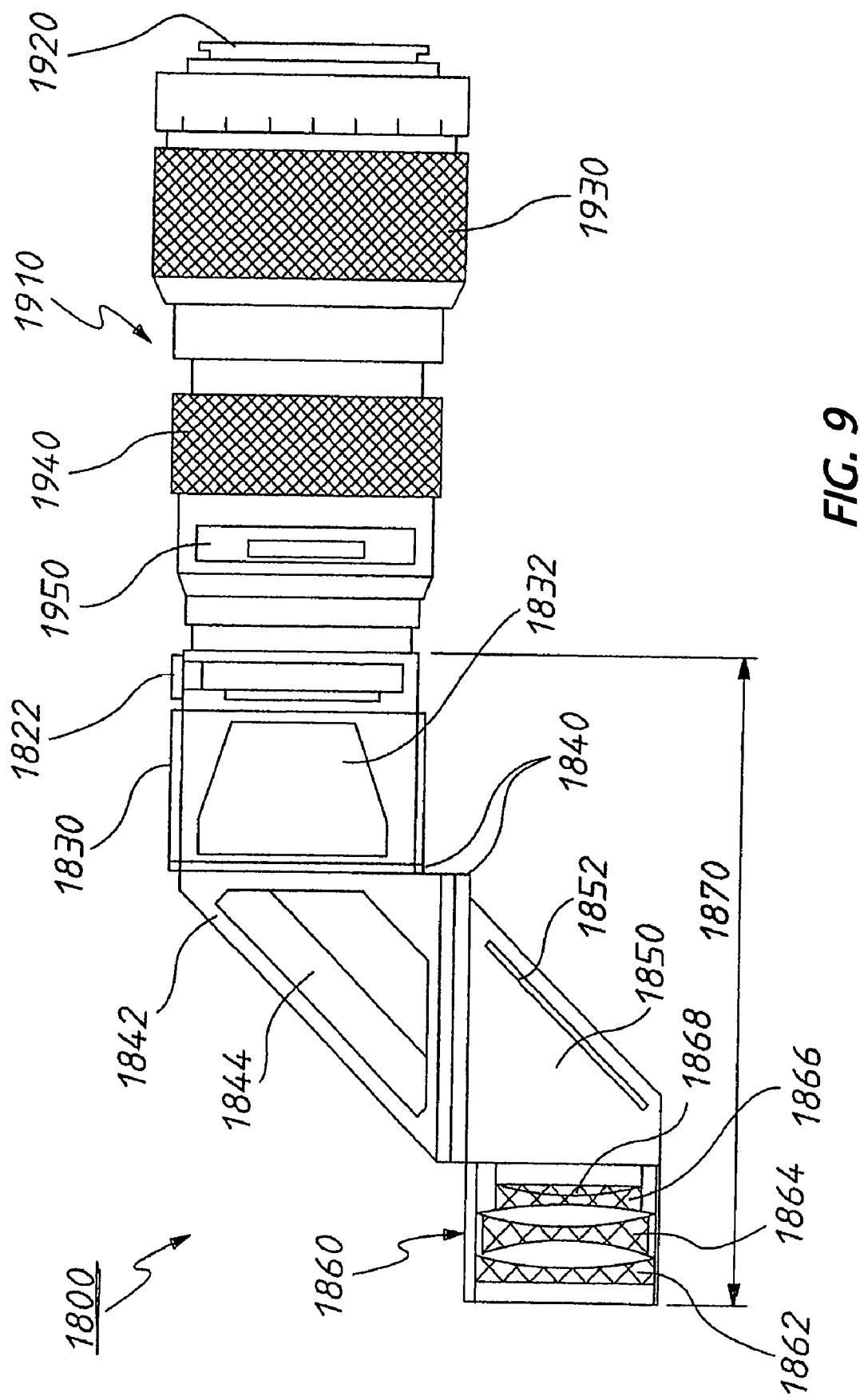
FIG. 9 is a side elevation view of a double-swivel optical lens system in accordance with another embodiment of the invention suitable for use with a video or film camera.

FIG. 9 illustrates a double-swivel optical lens system 1900 in accordance with another embodiment of the invention. Again, the attachment 1900 can be used with a camera (not shown), e.g. a video camera or a film camera. With regard to FIG. 9, features that have the same reference numerals as those in FIG. 8 are the same features and have the same function(s) or operation(s), unless the contrary intention appears. The description of such features and their configuration are not repeated in the description of FIG. 9 for the sake of brevity only.

Also, corresponding modifications and/or substitution of features may be made as described with reference to FIG. 8. The attachment 1900 comprises a negative lens unit 1860, an angled housing 1850 and a mirror 1852, two rotation mechanisms 1840, another angled housing 1842 and a roof prism 1844, and image rotator 1830 and a Pechan or dove prism 1832. The attachment 1900 optionally may have the drop-in filter 1822 as in FIG. 18, or this feature may be omitted. The coupling mechanism 1820 of FIG. 8 is omitted.

The attachment 1900 further comprises a macro lens unit with zoom capability 1910, which for example may be a F2.8 100 mm macro lens. In turn, the macro lens unit with zoom capability 1910 is connected to a coupling mechanism 1920. The macro lens unit 1910 may be coupled to the image rotator 1830 by a suitable rotation mechanism, in which case the rotation mechanism 1840 between the image rotator 1830 and the angled housing 1842 may be omitted. The macro lens unit with zoom capability 1910 is not a zoom lens with a macro mode. In this embodiment, the macro lens unit with zoom capability 1910 focuses on the negative lens unit 1860. This embodiment has a dedicated macro lens unit.

A drop-in filter 1950 can disposed between the image rotator 1830 and the macro lens unit with zoom capability 1910 in this embodiment. This may an externally rotatable one-stop polarizer. The macro lens unit 1910 may comprise a focus ring 1940 and a manual zoom control ring 1930, which can have the option to couple to the camera's own zoom control switch.

The embodiments of the present invention provide a double-swivel optical lens system that can be simply attached to existing zoom lenses (with diopter) or macro lenses of a camera, thereby eliminating the costs of additional optical elements. The negative lens unit is much simpler with a greatly reduced number of lens elements. Furthermore, the amount of light needed for this system is greatly reduced. For example, an F stop of F2.8 or F 4 may be achieved dependent upon the available maximum aperture of the zoom lens. All controls, such as aperture, focus and zoom, can be carried out on the zoom lens or macro lens of the camera. The double-swivel tip optical lens system allows greater versatility for an otherwise cumbersome camera and lens unit.

The axes of swivel and the image rotator may be motorized. For example, this might be done to film repeat sequences. The image rotator may be used to "dutch" (angle) the camera without adjusting the whole camera or tripod. The available depth of field with the embodiments of the invention is achieved at much lower light levels than other systems, thereby saving both time and money.

Still further, cameras may be practiced in accordance with embodiments of the invention, which comprise a double-swivel optical lens system as described hereinbefore with a zoom lens or macro lens 1812 of the camera 1810. Examples of such video or film cameras are well known to those skilled in the art.

Still further, cameras may be practiced in accordance with embodiments of the invention which comprise a double-swivel optical lens attachment as described hereinbefore with a zoom lens or macro lens of the camera, or a double-swivel optical lens attachment having a macro lens unit with zoom capability. Examples of such video or film cameras are well known to those skilled in the art.

3.3 Afocal Galilean Attachment with High Pupil Magnification

An aspect of the present lens system invention is an afocal Galilean attachment optical system ("afocal attachment") having high pupil magnification. Prior art wide-angle afocal attachments are invariably intended to increase the wide-angle capability of the prime lens to which they are attached. In the case where the prime lens is a zoom, the wide-angle attachment is almost always intended to increase the useful field of view at the short focal length extreme of the zoom range. By "useful field of view," it is meant that there is no appreciable increase of vignetting at the short focal length position.

In contrast, the afocal attachment of the present invention is generally intended to be used with a prime zoom lens adjusted towards longer end of its zoom range, i.e., closer to the longer end than to the shorter end. This is because the afocal attachment has a very large pupil magnification and would induce vignetting at the short end of the zoom range. Further, the afocal attachment is relatively long in order to provide access to objects that are otherwise difficult to photograph by virtue of their location, rather than to introduce short effective focal length (EFL) capability to the prime zoom lens.

It is noted that prior art wide-angle afocal attachments are designed to be as compact as possible. By contrast, the afocal attachment of the present invention is intentionally made very long in order to provide better photographic access, to provide room for prisms and/or mirrors to angle and/or rotate the field of view, and to also provide a relatively large depth of field.

Further, prior art wide-angle attachments generally have a pupil magnification PM (i.e., the ratio of exit to entrance pupil diameters) of less than 2 if the distortion mapping is rectilinear, although PM may increase to 4 or 5 in extreme cases. By contrast, the afocal attachment of the present invention has a substantially larger pupil magnification PM, as discussed in greater detail below.

Figure 10:
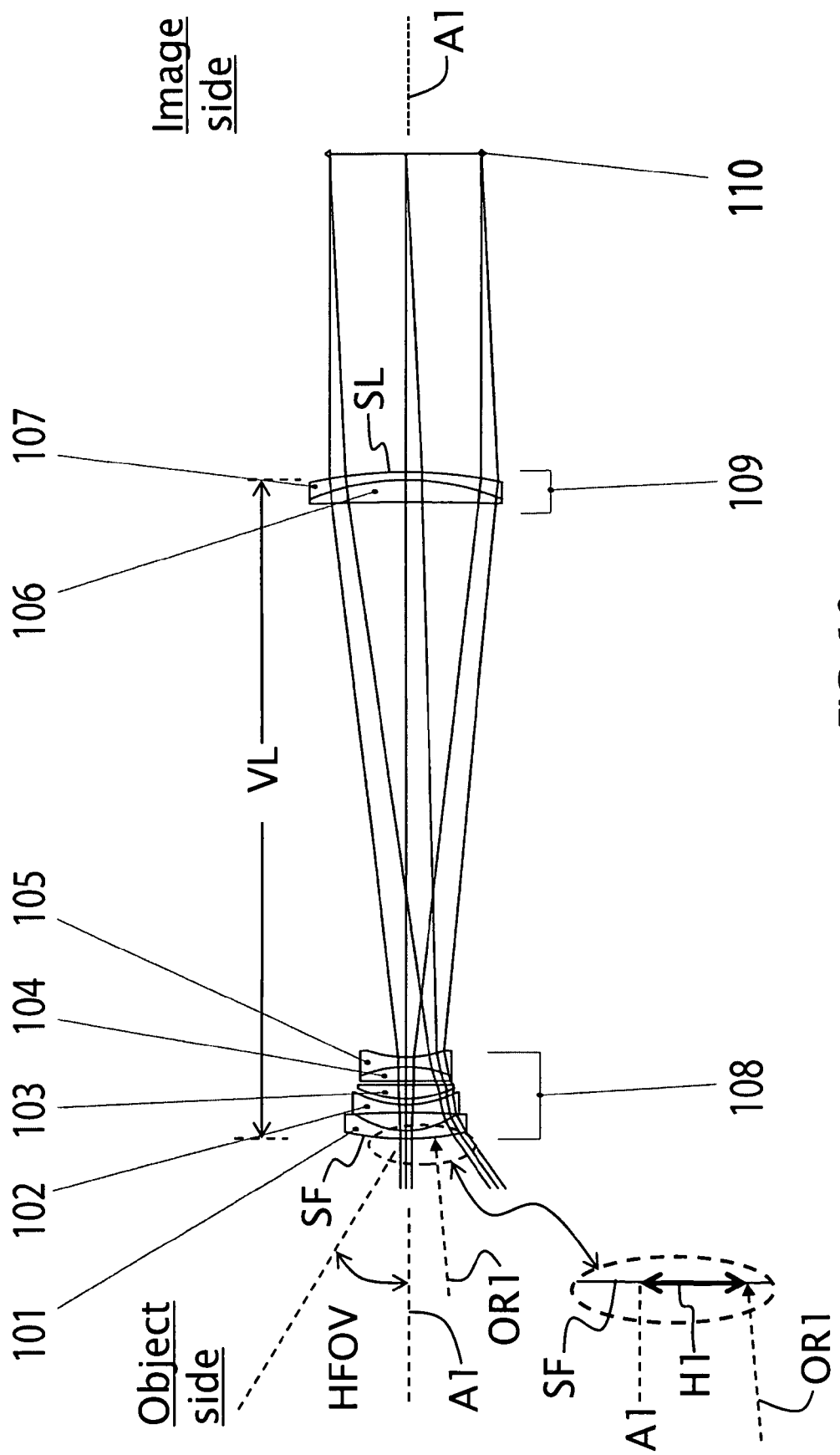
FIG. 10 is a schematic diagram of a first example (Example 1) of an afocal attachment illustrating a number of key measurements for parameters useful for characterizing the afocal attachment.

FIG. 10 is a schematic diagram of an example (Example 1) afocal attachment 10 illustrating a number of key measurements for parameters useful for characterizing the afocal attachment, namely the pupil magnification PM and a length parameter LP, defined below. The "object side" and "image side" of the lens is labeled for the sake of reference.

With reference to FIG. 10, afocal attachment 10 includes arranged along an optical axis A1 a front negative lens group 108 having a most objectwise "first" or "front" surface SF and a rear positive lens group 109 having a most imagewise "last" or "rear" surface SL. Lens groups 108 and 109 are arranged such that afocal attachment 10 has a Galilean configuration. Afocal attachment 10 has a vertex length VL, which is defined as the axial distance (e.g., in millimeters) between front lens surface SF and last lens surface SL. In addition, afocal attachment 10 has a half field-of-view HFOV, which is defined as the field of view in degrees measured from the optical axis in object space. The full field-of-view (FFOV) is 2·HFOV. Afocal attachment 10 has aperture stop 110 located at or imagewise of last surface SL, i.e., on the prime-lens side of last surface SL (see, e.g., FIG. 28).

One skilled in the art will understand that the exit pupil and entrance pupil locations and sizes are defined by the location and size of aperture stop 110 and understands how the size and location of each are determined from the particular lens design parameters of afocal attachment 10. Note that the exit pupil and aperture stop 110 have the same size and location when the aperture stop is located imagewise of last lens surface SL. Thus, in the discussion below, the aperture stop and exit pupil are both identified by reference number 110.

The entrance pupil is the image of the aperture stop as seen from the front of afocal attachment 10. Its location is given by extending the path of a chief ray as it enters the front of the lens until it crosses optical axis A1. For afocal attachment 10, this will be a short distance imagewise of the front element 101 and so is not shown for ease of illustration. Note, however, that the location of the entrance and exit pupils is not what matters for calculating the pupil magnification, but rather only their diameters matter. The respective diameters $D_{EN}$ and $D_{EX}$ of the entrance and exit pupils for an afocal system are double the entrance and exit marginal ray heights, respectively, and so are easily calculated by one skilled in the art.

Afocal attachment 10 is characterized by having unusually great length relative to the diameter of its front surface SF. The diameter of front surface SF depends largely on the FFOV. Accordingly, with reference to the close-up inset of FIG. 10, it is convenient to define a parameter Hi as the intersection height at front surface SF with an off-axis ray OR1 which enters the system at an angle of 1° from optical axis A1 and which intersects the last surface SL at the optical axis (not shown to scale). Note that if aperture stop AS were located at last surface SL, then OR1 would be a chief ray for a field angle of 1°.

The pupil magnification PM is defined as the exit pupil diameter $D_{EX}$ divided by the entrance pupil diameter $D_{EN}$. $D_{EX}$ and $D_{EN}$ can conveniently be calculated by tracing a paraxial ray PR1 through the system. The ray enters the system parallel to the optical axis at a height $P_{EN}=1$. The intersection height of the paraxial ray PR1 is then given by $P_{EX}$. The pupil magnification can then be calculated as $PM = P_{EX}/P_{EN} = P_{EX}$ Afocal attachment 10 of the present invention is characterized by a pupil magnification PM>4, more preferably PM≧6, even more preferably PM≧8 and yet even more preferably PM≧10.

Afocal attachment 10 of the present invention is further characterized by a length parameter LP, which is defined as:

$$LP = |VL/H1|$$

where the notation |x| means the "absolute value of x." In an example embodiments, LP>200, more preferably LP≧300, even more preferably LP≧500 and yet even more preferably LP≧700. The length parameter is a quantitative measure of the relative length of afocal attachment 10.

One skilled in the art of lens design is readily able to calculate parameters PM and LP for any of the example lenses set forth herein, as well as for any afocal attachment lens for which the design is available or which may be readily ascertained from standard reverse-engineering techniques used for lenses.

Six example designs for afocal attachment 10 are set forth below, along with MTF and distortion plots. The MTF and distortion were computed by placing a 100 mm paraxial lens (not shown) at the exit pupil (110, 210, etc.) of afocal attachment 10, and then evaluating the aberrations at a plane located 100 mm from the paraxial lens. All six example afocal attachments have a Galilean negative-positive lens group structure. In common with all the examples, the exit pupil is located 160 mm from the rearmost lens surface SL. This allows plenty of room to match the exit pupil of the attachment with the entrance pupil of the prime lens to which the afocal attachment attaches (see FIG. 28).

In the Examples below, S#=surface number, TYPE=surface type (i.e., standard ST or aspheric ASPH), R=radius, T=thickness, DIA=lens diameter, OBJ=object, IM=image, INF=infinity, STO=aperture stop, and PAR=paraxial. All measurements are in millimeters unless otherwise noted.

Aspheric surfaces are described by the following equation:

$$Z = r^2/(R(1+(1-(1+k)r^2/R^2)^{1/2})) + C4 \cdot r^4 + C6 \cdot r^6 + C8 \cdot r^8 + C10 \cdot r^{10} + C12 \cdot r^{12} + C14 \cdot r^{14} + C16 \cdot r^{16}$$

where Z is the displacement in the direction of the optical axis measured from the polar tangent plane, r is the radial coordinate, R is the base radius of curvature, k is the conic constant, and Ci is the $i^{th}$ order aspherical deformation constant.

EXAMPLE 1

Example 1 of afocal attachment 10 is shown in FIG. 10 and has the following lens prescription:

| LENS DESIGN PRESCRIPTION FOR EXAMPLE 1 | | | | | |
|---|---|---|---|---|---|
| S# | TYPE | R | T | GLASS | DIA |
| OBJ | INF | INF | INF | — | 0 |
| 1 | ST | 88.15 | 4 | N-PSK53 | 48 |
| 2 | ST | 25.31 | 9 | — | 40 |
| 3 | ST | −270.45 | 4 | N-FK51 | 42 |
| 4 | ST | 35.03 | 3 | — | 40 |
| 5 | ST | 35.86 | 7 | N-SF57 | 38 |
| 6 | ST | INF | 2 | — | 38 |
| 7 | ST | INF | 7 | N-SK5 | 36 |
| 8 | ST | −38.42 | 5 | N-LASF43 | 36 |
| 9 | ST | 38.26 | 280 | — | 30.5 |
| 10 | ST | −861.03 | 11 | N-SK16 | 72 |
| 11 | ST | −80.84 | 4 | N-KZFS8 | 76 |
| 12 | ST | −144.38 | 160 | — | 76 |
| STO | PAR | — | 100 | — | 60 |
| IM | ST | INF | — | — | 7.988553 |

Example 1 also has the following specifications:

| EXAMPLE 1 | |
|---|---|
| SPECIFICATIONS | |
| Entrance Pupil Diameter | 4.43 mm |
| Exit Pupil Diameter: | 60 mm |
| Pupil Magnification PM | 13.56 |
| Exit Pupil Distance | 160 mm |
| Full Field of View | 57.1° |
| Vertex Length | 336 mm |
| Length Parameter LP | 513 |
| Waveband | Visible (F, d, C) |

In Example 1, the positive group 109 is a simple cemented doublet, and thus it primarily corrects spherical aberration, coma, and longitudinal chromatic aberration. The 5-element negative group 108 primarily corrects distortion, astigmatism, and lateral chromatic aberration.

Figure 11:
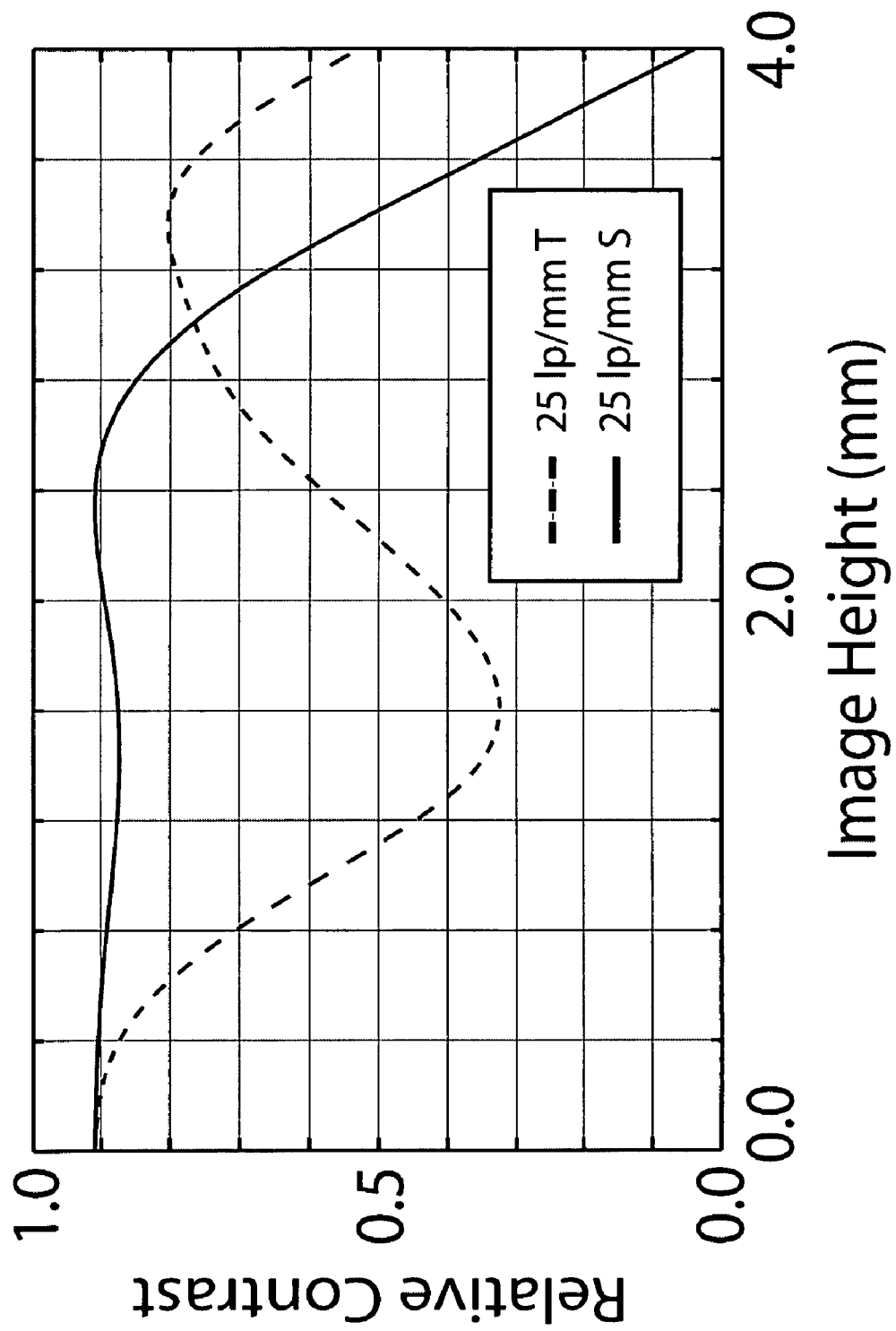
FIG. 11 is a plot of the MTF (relative contrast) vs. image height for 25 line-pairs per millimeter (1 p/mm) for tangential (T) and sagittal (S) rays for Example 1 of FIG. 10.
Figure 12:
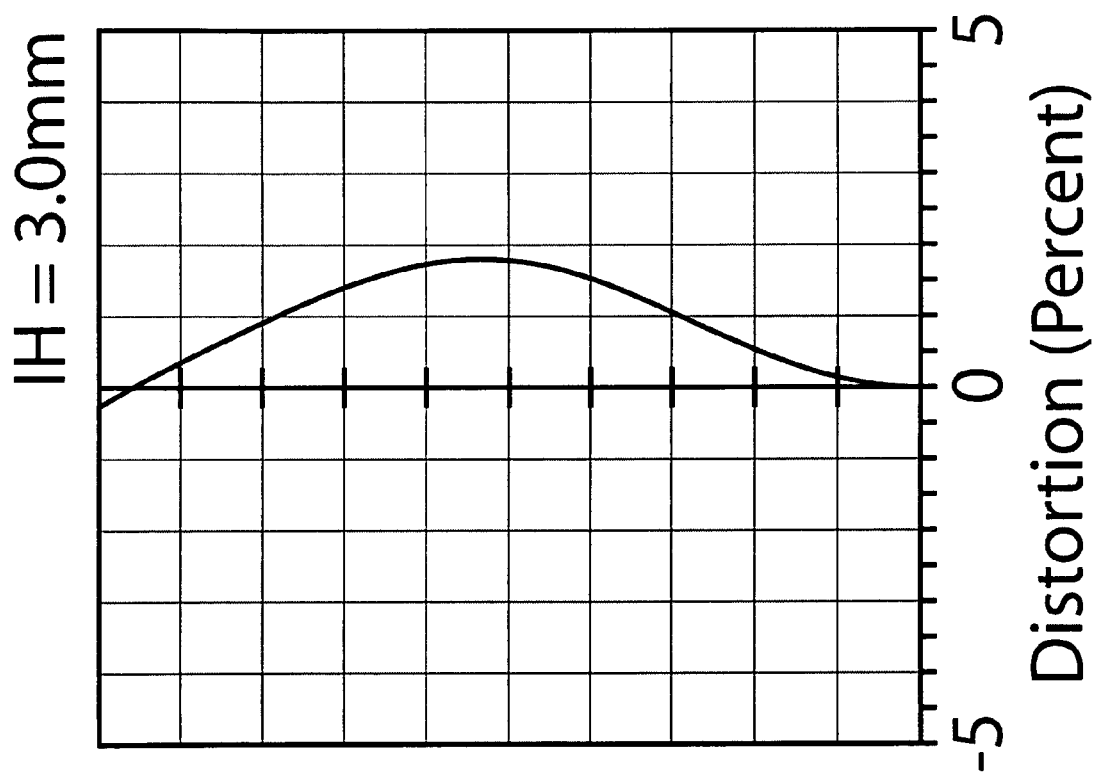
FIG. 12 is a plot of distortion for an image height IH=3 mm for Example 1.

FIG. 11 is a plot of the MTF (relative contrast) vs. image height for 25 line-pairs per millimeter (1 p/mm) for tangential (T) and sagittal (S) rays. FIG. 12 is a plot of distortion for an image height IH=3 mm. Both plots indicate excellent imaging performance.

EXAMPLE 2

Figure 13:
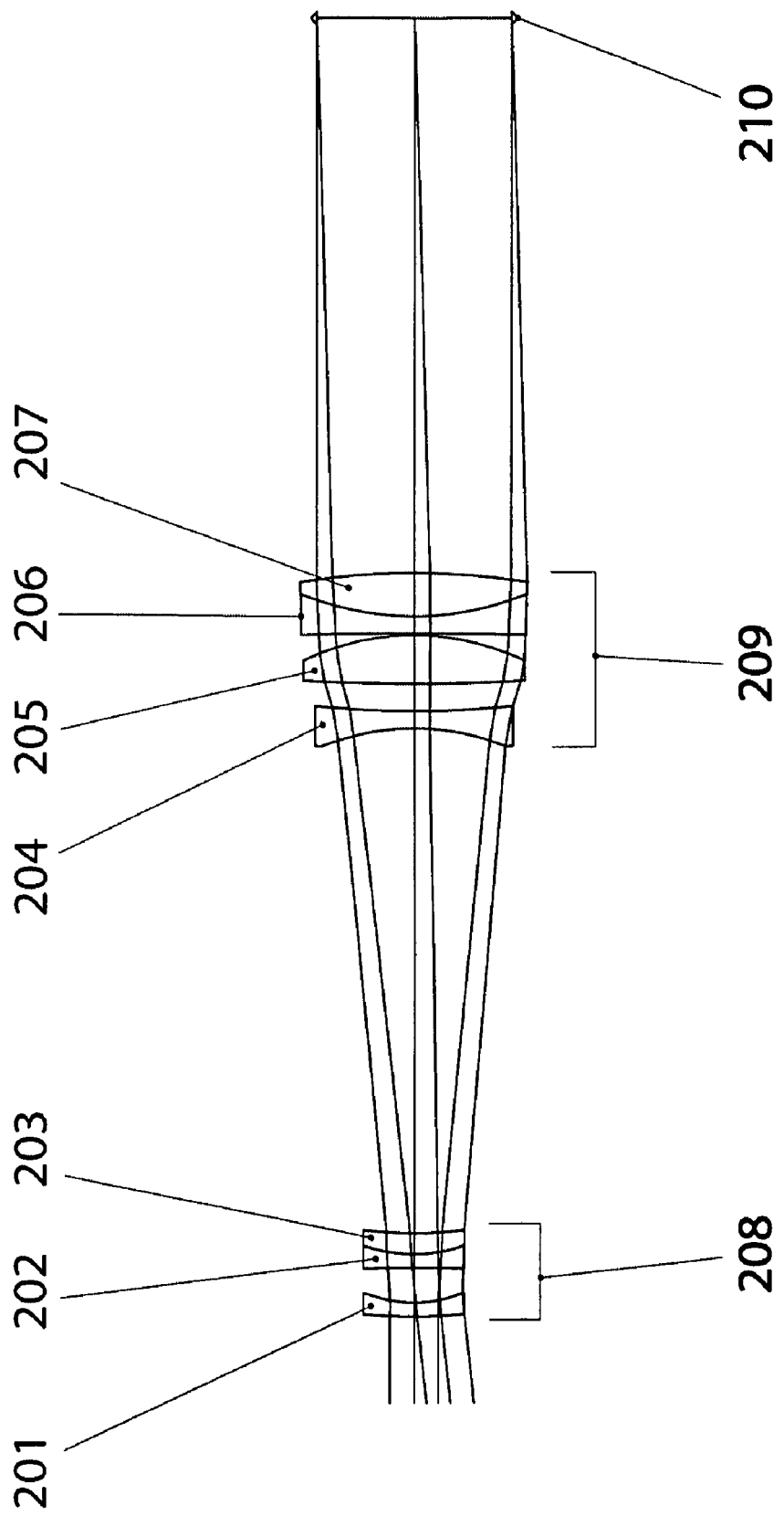
FIG. 13 is a schematic diagram of second example (Example 2) of the afocal attachment of the present invention.

Example 2 of afocal attachment 10 is shown in FIG. 13 and has the following lens prescription:

| LENS DESIGN PRESCRIPTION FOR EXAMPLE 2 | | | | | |
|---|---|---|---|---|---|
| S# | TYPE | R | T | GLASS | DIA |
| OBJ | INF | INF | INF | — | 0 |
| 1 | ST | INF | 25 | — | 0 |
| 2 | ST | 195.1199 | 4 | S-BSM14 | 31.51449 |
| 3 | ST | 44.36588 | 10 | — | 30.24148 |
| 4 | ST | −660.3498 | 4 | S-BSM14 | 30.93034 |
| 5 | ST | 53.10739 | 6 | S-TIH6 | 31.44814 |
| 6 | ST | 140.4154 | 146.0878 | — | 31.42639 |

-continued

| LENS DESIGN PRESCRIPTION FOR EXAMPLE 2 | | | | | |
|---|---|---|---|---|---|
| S# | TYPE | R | T | GLASS | DIA |
| 7 | ST | −79.78889 | 5 | S-BSL7 | 56.56599 |
| 8 | ST | 326.3333 | 7.913365 | | 60.87322 |
| 9 | ST | 696.8776 | 14 | S-BSM14 | 65.93368 |
| 10 | ST | −82.96206 | 0.4999765 | | 68.17091 |
| 11 | ST | −1720.805 | 5 | S-TIM2 | 68.74205 |
| 12 | ST | 97.0454 | 12.5 | S-BSM14 | 69.4879 |
| 13 | ST | −241.7777 | 160 | | 69.74354 |
| STO | PAR | — | 100 | — | 60 |
| IM | ST | INF | — | — | 6.008697 |

Example 2 also has the following specifications:

EXAMPLE 2

| SPECIFICATIONS | |
|---|---|
| Entrance Pupil Diameter | 15 mm |
| Exit Pupil Diameter: | 60 mm |
| Pupil Magnification PM | 4 |
| Exit Pupil Distance | 160 mm |
| Full Field of View | 13.8° |
| Vertex Length | 215 mm |
| Length Parameter LP | 209 |
| Waveband | Visible (F, d, C) |

The positive group 209 comprises four elements (204, 205, 206, and 207), and is able to substantially impact astigmatism correction. The basic structure of 209 is similar to tube lenses commonly used in microscopes. The negative group 208 is relatively simple, comprising just three elements. The afocal system is extremely well corrected, and would have negligible impact on the aberration balance of any prime lens to which it is attached.

Example #2 represents a design near one extreme of the GBO patent space, in which both PM and LP are relatively small.

Figure 14:
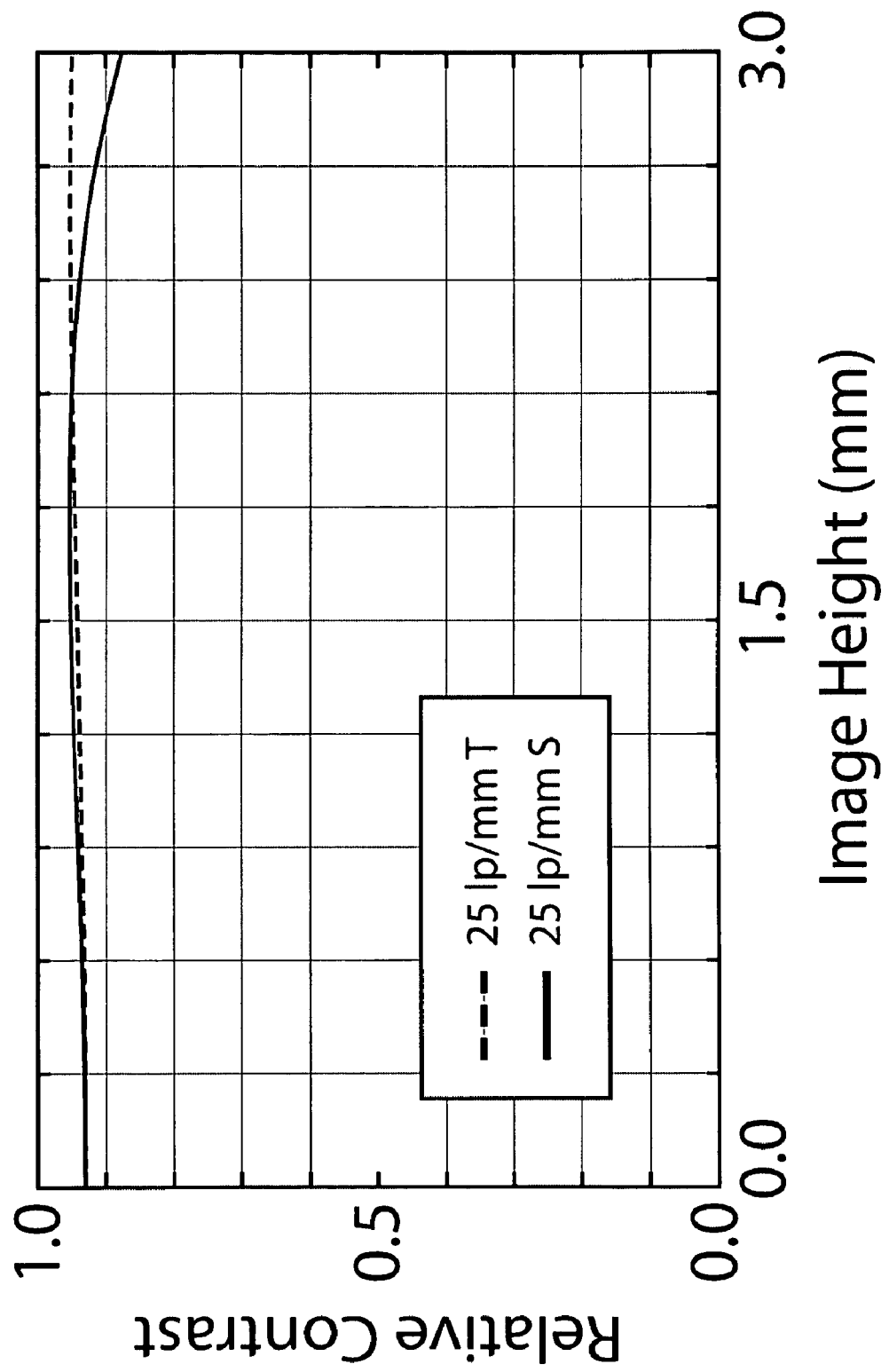
FIG. 14 is a plot of the MTF (relative contrast) vs. image height for 25 line-pairs per millimeter (1 p/mm) for tangential (T) and sagittal (S) rays for Example 2.
Figure 15:
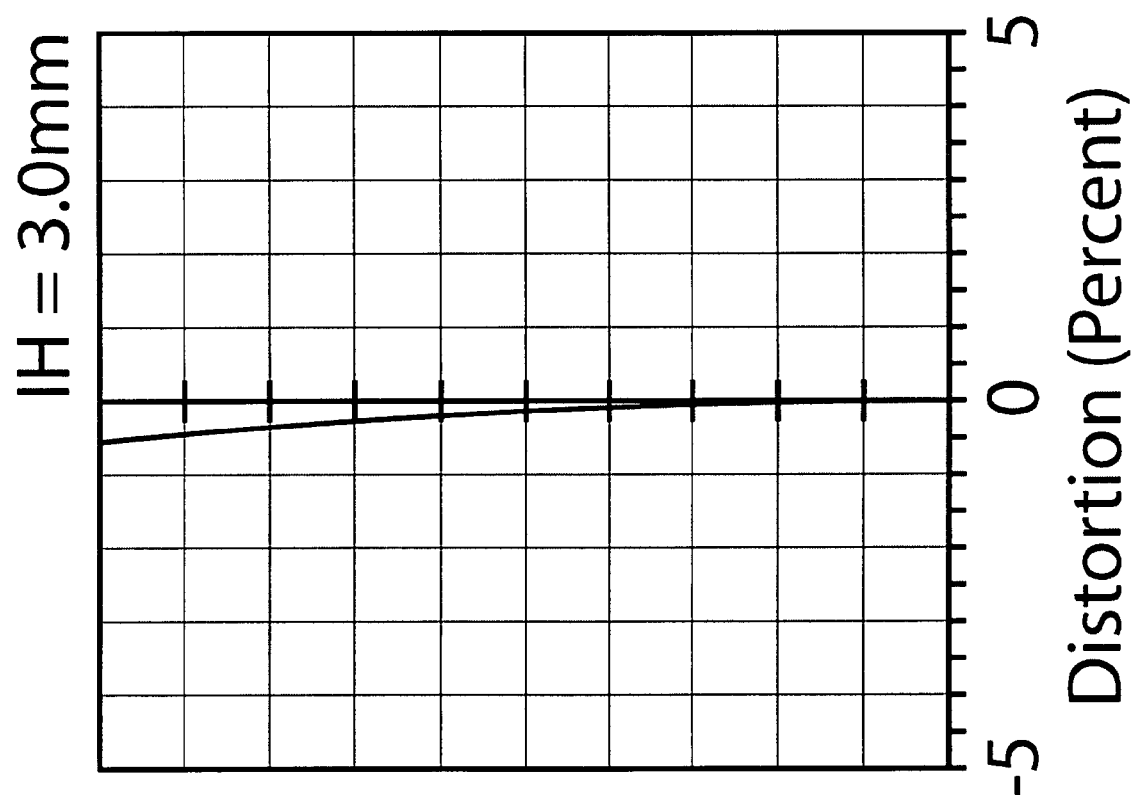
FIG. 15 is a plot of distortion for an image height IH=3 mm for Example 2.

FIG. 14 is a plot of the MTF (relative contrast) vs. image height for 25 line-pairs per millimeter (1 p/mm) for tangential (T) and sagittal (S) rays. FIG. 15 is a plot of distortion for an image height IH=3 mm. Both plots indicate excellent imaging performance.

EXAMPLE 3

Example 3 of afocal attachment 10 is shown in FIG. 16 and FIG. 17 for both infinity and close focus positions respectively, and has the following lens prescription:

| LENS DESIGN PRESCRIPTION FOR EXAMPLE 3 | | | | | |
|---|---|---|---|---|---|
| S# | TYPE | R | T | GLASS | DIA |
| OBJ | INF | INF | INF | — | 0 |
| 1 | ST | INF | 0 | | 0 |
| 2 | ST | 122.1312 | 4 | S-BSM14 | 49.01134 |
| 3 | ST | 57.58075 | 10.94886 | | 46.13862 |
| 4 | ST | −240.3315 | 4 | S-BSM14 | 45.07852 |
| 5 | ST | 55.95508 | 6 | S-TIH6 | 44.52356 |
| 6 | ST | 120.6615 | 453.1182 | | 44.00591 |
| 7 | ST | −68.36387 | 5 | S-BSL7 | 56.50125 |
| 8 | ST | 264.3109 | 10.40226 | | 60.60683 |
| 9 | ST | 573.009 | 14 | S-BSM14 | 66.77078 |
| 10 | ST | −83.70066 | 14.48841 | | 68.68301 |
| 11 | ST | −687.4014 | 5 | S-TIM2 | 68.84998 |

-continued

| LENS DESIGN PRESCRIPTION FOR EXAMPLE 3 | | | | | |
|---|---|---|---|---|---|
| S# | TYPE | R | T | GLASS | DIA |
| 12 | ST | 184.2842 | 11 | S-BSM14 | 69.2496 |
| 13 | ST | −307.885 | 160 | | 69.53463 |
| STO | PAR | — | 100 | — | 60 |
| IM | ST | INF | — | — | 5.903116 |

Example 3 illustrates a method in which close focusing may be achieved in the present invention. In Example 3, close focusing is accomplished by increasing the air gap separating negative group 308 from positive group 309. In particular, focusing from an object located at infinity to an object in contact with the front surface is done by increasing thickness #6 from 453.1182 mm to 530.4587 mm. Image quality remains extremely high for all focus distances.

Example 3 has the following specifications:

EXAMPLE 3

| SPECIFICATIONS | |
|---|---|
| Entrance Pupil Diameter | 7.5 mm |
| Exit Pupil Diameter: | 60 mm |
| Pupil Magnification PM | 8 |
| Exit Pupil Distance | 160 mm |
| Full Field of View | 27° |
| Vertex Length | 538 mm |
| Length Parameter LP | 357 |
| Waveband | Visible (F, d, C) |

Figure 18:
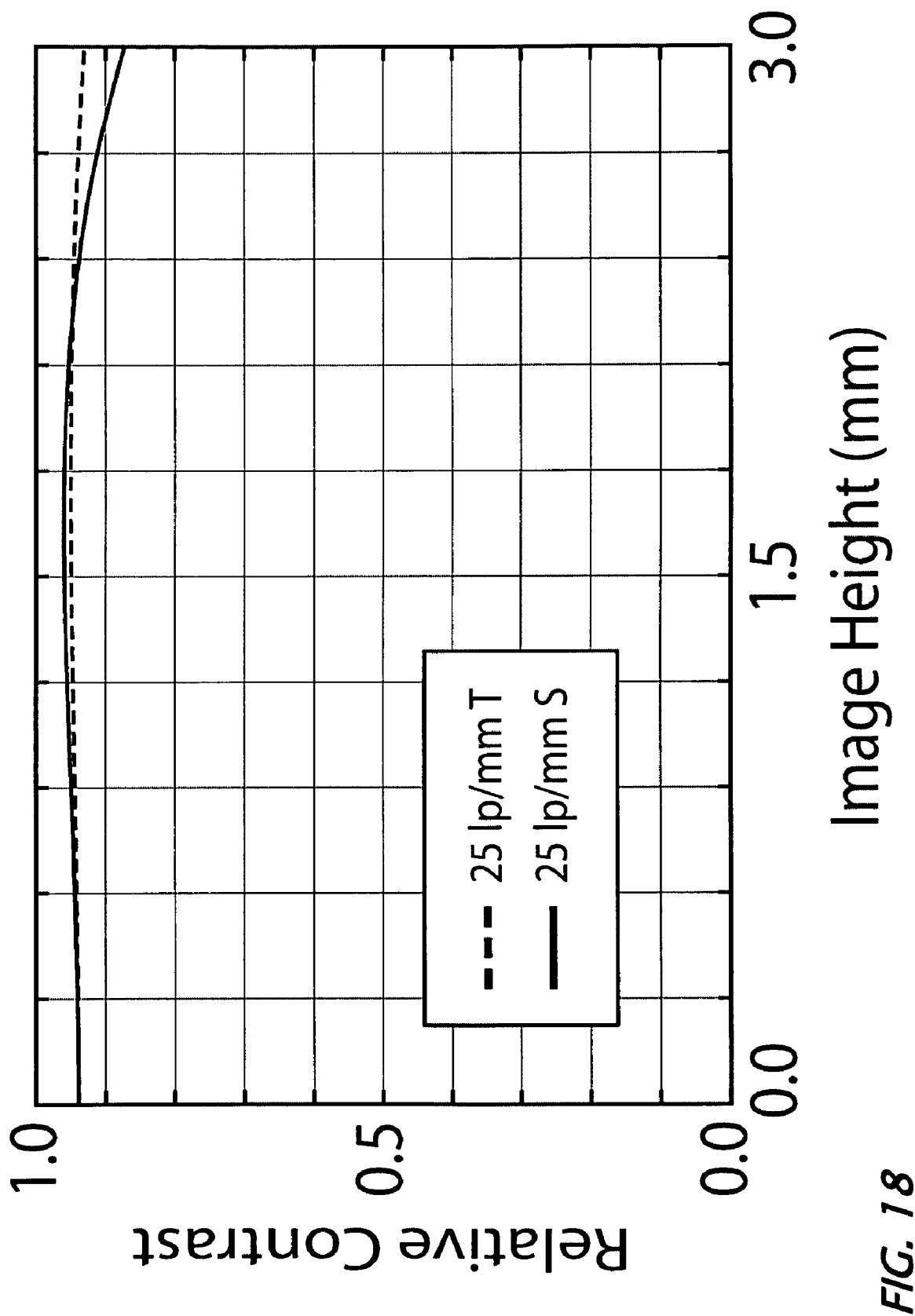
FIG. 18 and FIG. 19 are plots of the MTF (relative contrast) vs. image height for 25 line-pairs per millimeter (1 p/mm) for tangential (T) and sagittal (S) rays for both infinity and close focus positions respectively, for Example 3.
Figure 19:
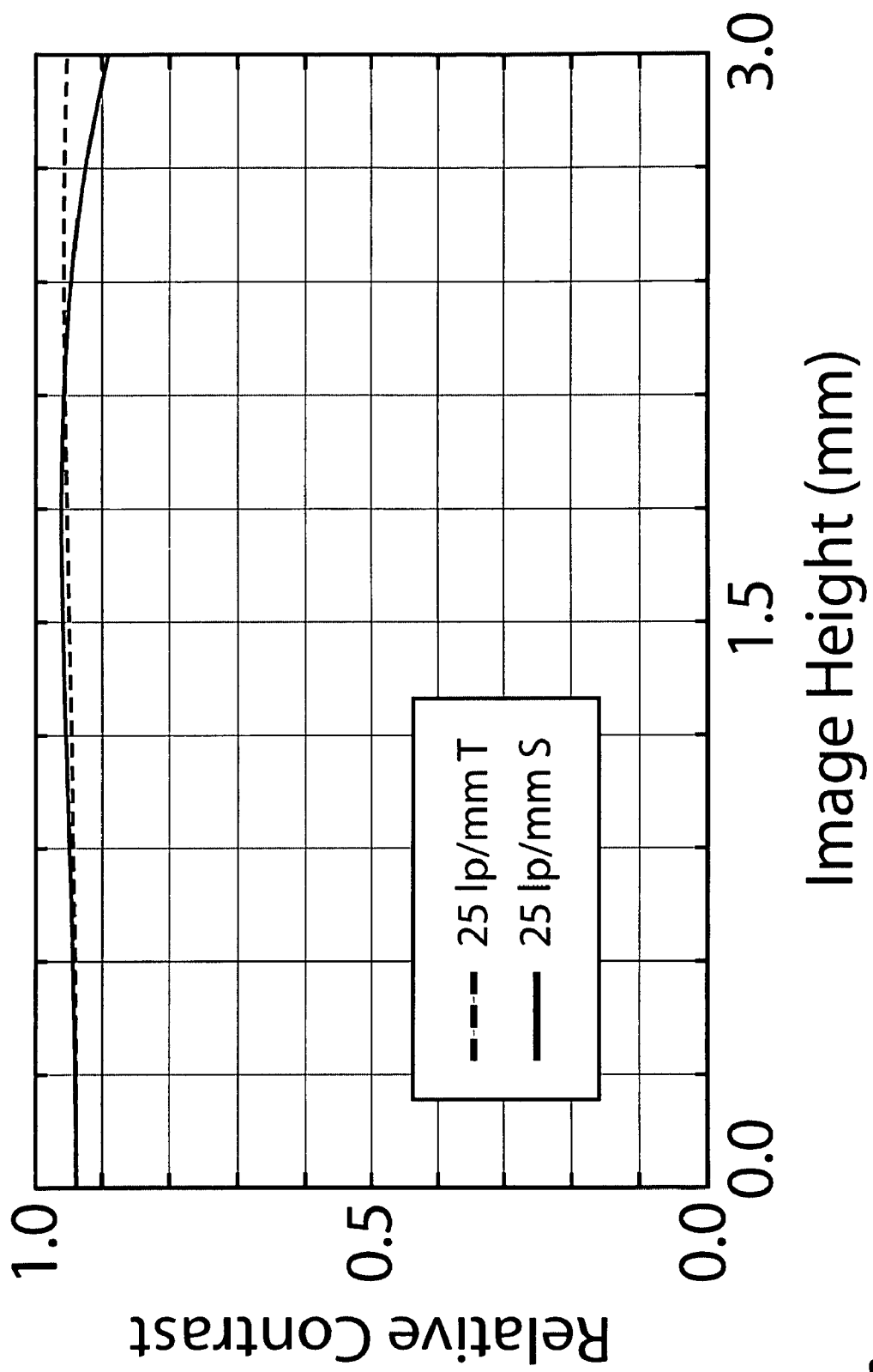

FIGS. 18 and 19 are plots of the MTF (relative contrast) vs. image height for 25 line-pairs per millimeter (1 p/mm) for tangential (T) and sagittal (S) rays for both infinity and close focus positions respectively.

Figure 20:
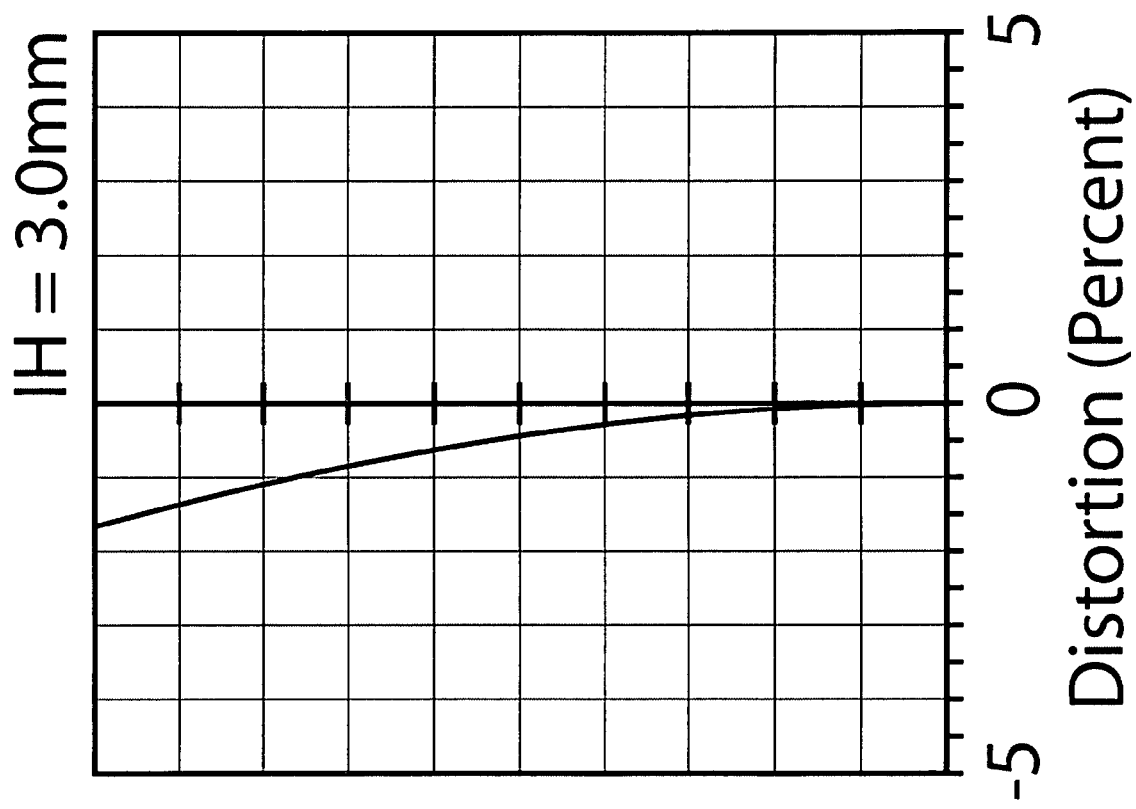
FIG. 20 and FIG. 21 are plots of distortion for an image height IH=3 mm both infinity and close focus positions, respectively, for Example 3.
Figure 21:
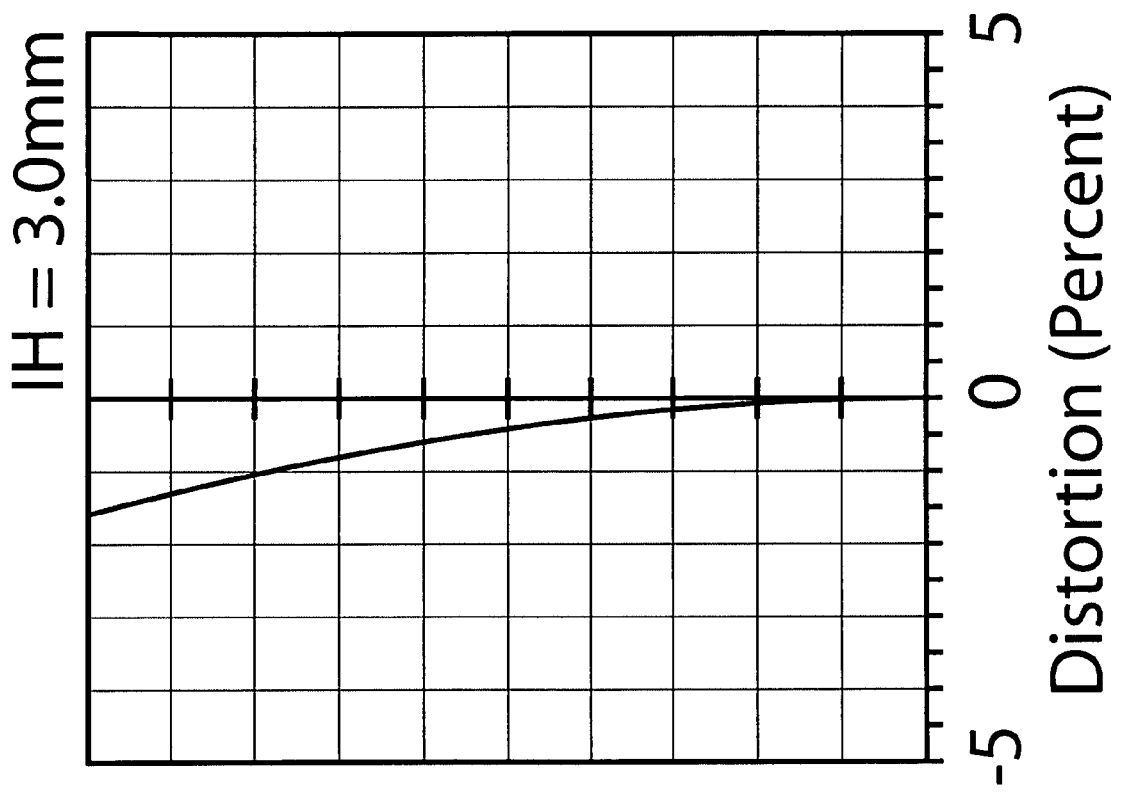

FIGS. 20 and 21 are plots of distortion for an image height IH=3 mm both infinity and close focus positions, respectively. The plots indicate excellent imaging performance.

EXAMPLE 4

Figure 22:
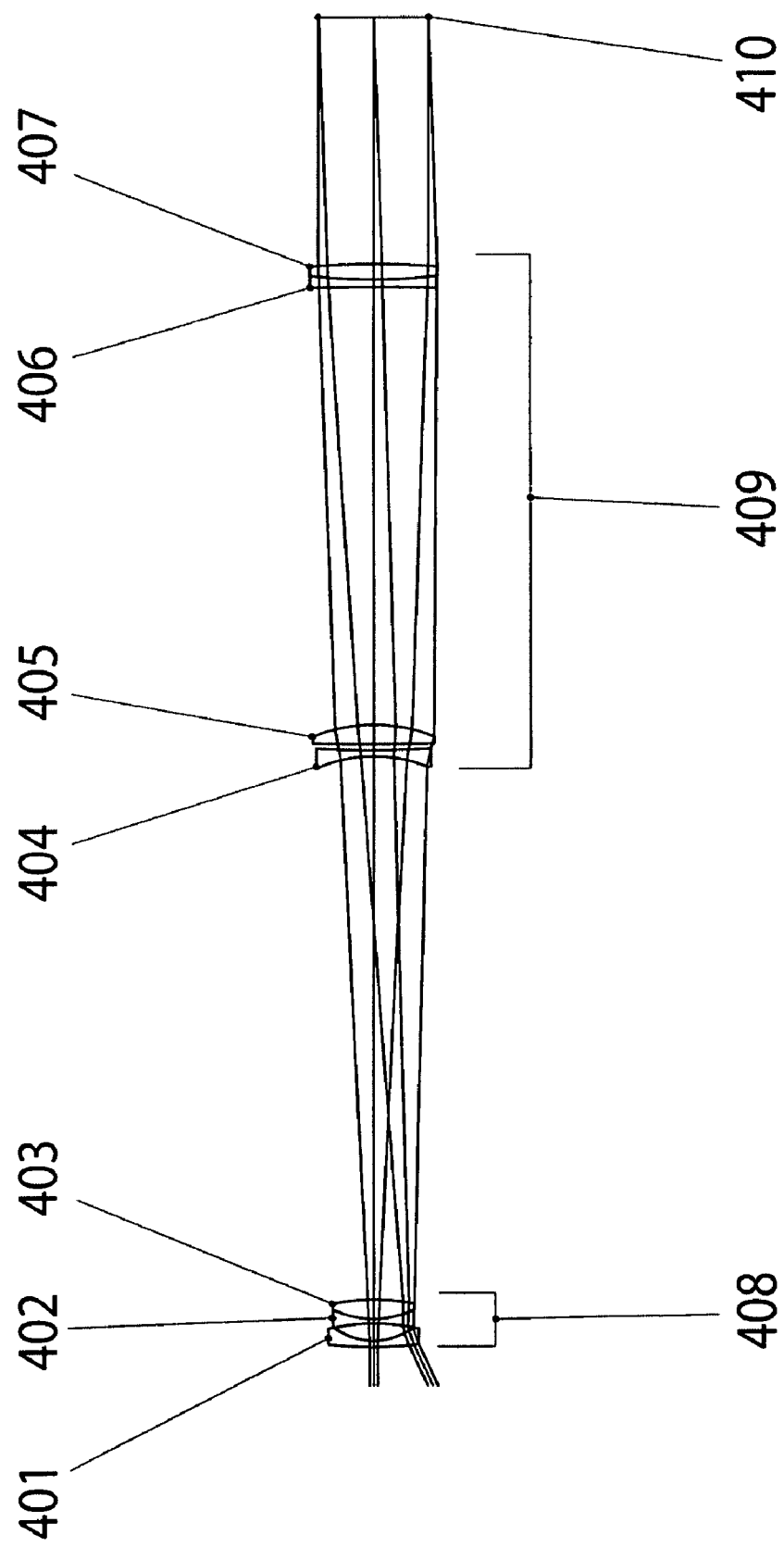
FIG. 22 is a schematic diagram of fourth example (Example 4) of the afocal attachment of the present invention.

Example 4 of afocal attachment 10 is shown in FIG. 22 and has the following lens prescription:

| LENS DESIGN PRESCRIPTION FOR EXAMPLE 4 | | | | | |
|---|---|---|---|---|---|
| S# | TYPE | R | T | GLASS | DIA |
| OBJ | INF | INF | INF | — | 0 |
| 1 | ST | INF | 25 | | 0 |
| 2 | ST | 172.8747 | 4 | ACRYLIC | 49.57537 |
| 3 | ASPH | 28.13959 | 11.32702 | | 43.03438 |
| 4 | ST | −87.13057 | 3 | S-LAL8 | 42.97893 |
| 5 | ST | 43.50225 | 12.5 | S-FTM16 | 44.06375 |
| 6 | ST | −99.51582 | 354.0156 | — | 44.8324 |
| 7 | ST | −66.18037 | 4 | S-BSL7 | 58.68107 |
| 8 | ST | 440.1247 | 4.018706 | | 62.9463 |
| 9 | ST | 1139.243 | 12.5 | S-BSM14 | 65.10248 |
| 10 | ST | −76.451 | 284.6348 | — | 66.69302 |
| 11 | ST | −1501.181 | 5 | S-TIM2 | 69.35217 |
| 12 | ST | 270.971 | 10 | S-BSM14 | 69.53155 |
| 13 | ST | −410.1233 | 160 | | 69.70328 |
| STO | PAR | — | 100 | — | 60 |
| IM | ST | INF | — | — | 6.008836 |

The values for the aspheric parameters for surface S3 are as follows (those parameters not listed have a value of zero):

EXAMPLE 4

ASPHERE VALUES

| PARAMETER | VALUE |
| --- | --- |
| k | −2.627492 |
| C4 | $9.0004874 \times 10^{-6}$ |
| C6 | $-4.2217971 \times 10^{-9}$ |
| C8 | $-1.1221548 \times 10^{-12}$ |
| C10 | $: 1.9828446 \times 10^{-15}$ |

Example 4 has the following specifications:

EXAMPLE 4

| SPECIFICATIONS | |
| --- | --- |
| Entrance Pupil Diameter | 4.5 mm |
| Exit Pupil Diameter: | 13 mm |
| Pupil Magnification PM | 13.3 |
| Exit Pupil Distance | 160 mm |
| Full Field of View | 43.2° |
| Vertex Length | 705 mm |
| Length Parameter LP | 776 |
| Waveband | Visible (F, d, C) |

Figure 23:
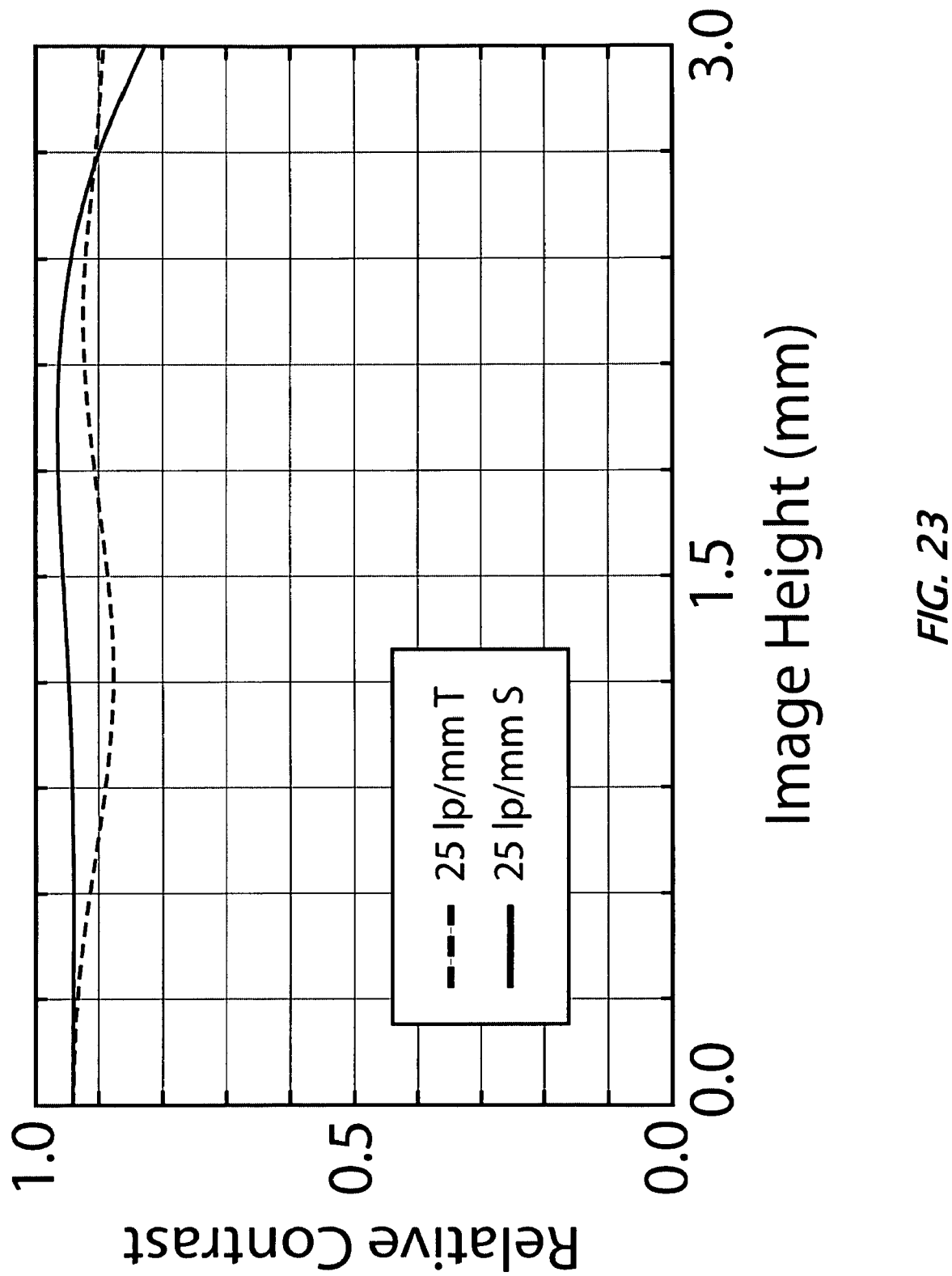
FIG. 23 is a plot of the MTF (relative contrast) vs. image height for 25 line-pairs per millimeter (1 p/mm) for tangential (T) and sagittal (S) rays for Example 4.

In Example #4, PM and LP have been increased to 13.33 and 776, respectively. To adequately correct distortion, the second surface of the first element 401 has been made aspherical. First element 401 is made of acrylic to allow for inexpensive molding in mass production. However, this front element 401 can also be made of glass. FIG. 23 is a plot of the MTF (relative contrast) vs. image height for 25 line-pairs per millimeter (1 p/mm) for tangential (T) and sagittal (S) rays.

Figure 24:
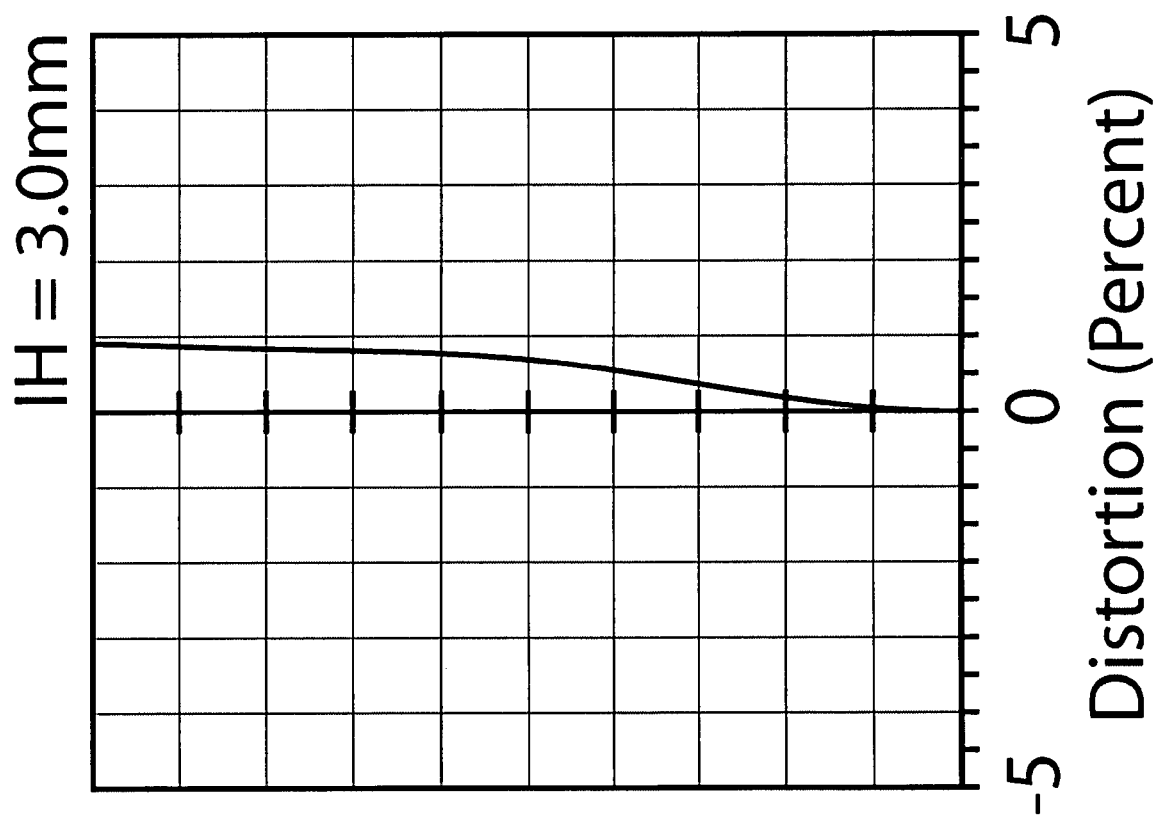
FIG. 24 is a plot of distortion for an image height IH=3 mm for Example 4.

FIG. 24 is a plot of distortion for an image height IH=3 mm. Particular attention has been paid to the shape of the distortion curve to ensure that the system has good, straight-line rendition. This is accomplished by constraining the real image height at 0.7 of the field to be equal to 0.7 times the full field real image height. The plots indicate excellent imaging performance.

EXAMPLE 5

Figure 25:
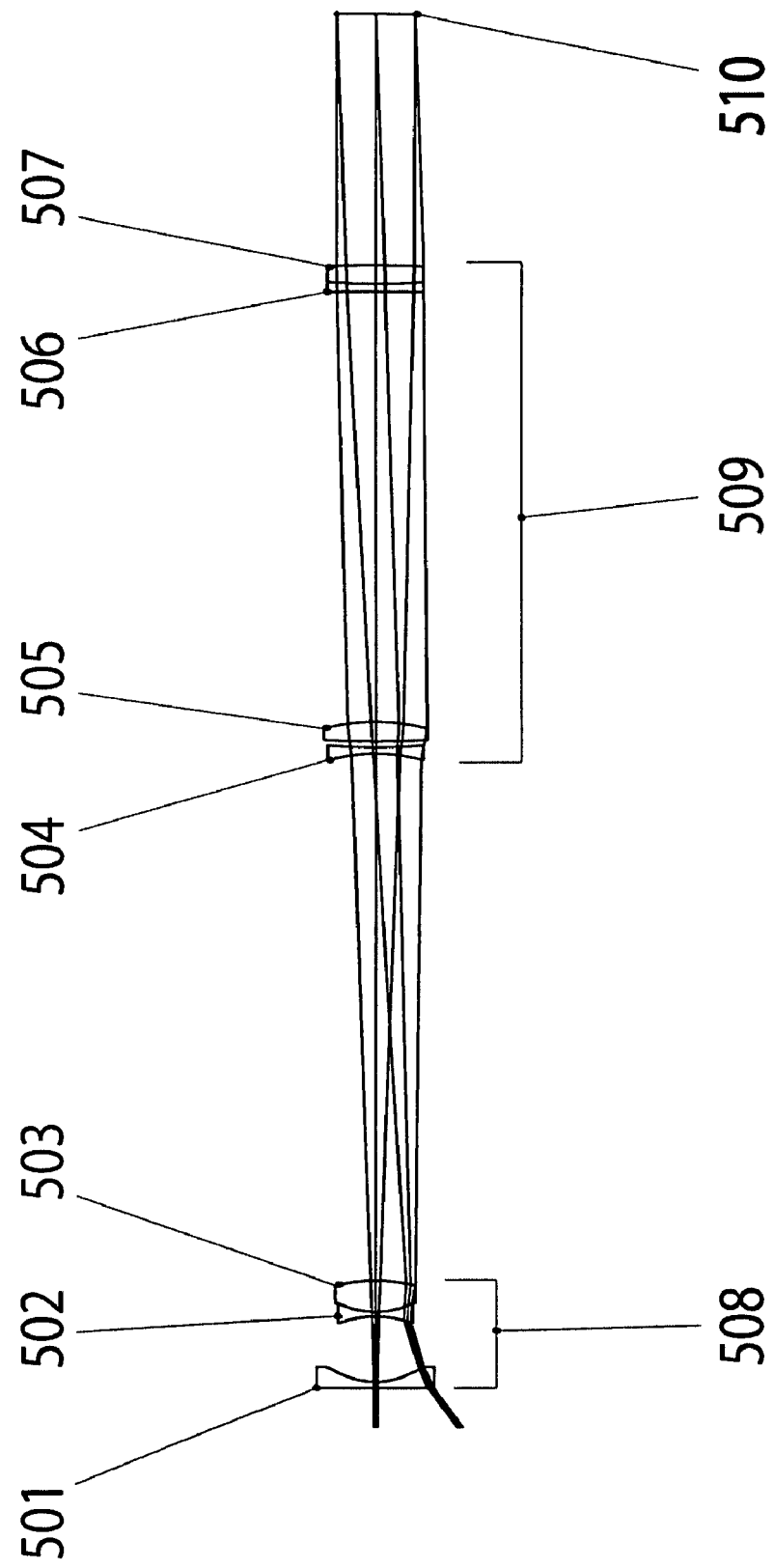
FIG. 25 is a schematic diagram of a fifth example (Example 5) of the afocal attachment of the present invention.

Example 5 of afocal attachment 10 is shown in FIG. 25 and has the following lens prescription:

| LENS DESIGN PRESCRIPTION FOR EXAMPLE 5 | | | | | |
| --- | --- | --- | --- | --- | --- |
| S# | TYPE | R | T | GLASS | DIA |
| OBJ | INF | INF | INF | — | 0 |
| 1 | ST | INF | 25 | — | 0 |
| 2 | ST | −3727.214 | 4 | ACRYLIC | 59.99759 |
| 3 | ASPH | 29.29989 | 41.83901 | | 50.00801 |
| 4 | ST | −42.31193 | 3 | S-LAL8 | 36.45973 |
| 5 | ST | 35.8772 | 20 | S-FTM16 | 38.1729 |
| 6 | ST | −65.91027 | 337.7155 | — | 40.98335 |
| 7 | ST | −71.43676 | 4 | S-BSL7 | 47.0801 |
| 8 | ST | 249.9053 | 3.804346 | — | 49.36452 |
| 9 | ST | 359.4984 | 12.63421 | S-BSM14 | 51.09736 |
| 10 | ST | −82.54795 | 275.2526 | — | 52.90696 |
| 11 | ST | −1359.685 | 5 | S-TIM2 | 49.45262 |
| 12 | ST | 247.7238 | 12 | S-BSM14 | 49.49473 |
| 13 | ST | −406.0566 | 160 | — | 49.58836 |
| STO | PAR | — | 100 | — | 40 |
| IM | ST | INF | — | — | 5.970178 |

The values for the aspheric parameters for surface S3 are as follows (those parameters not listed have a value of zero):

EXAMPLE 5

ASPHERE VALUES

| PARAMETER | VALUE |
| --- | --- |
| k | −1.85985 |
| C4 | $7.5208229 \times 10^{-7}$ |
| C6 | $6.6098168 \times 10^{-9}$ |
| C8 | $-1.7891359 \times 10^{-11}$ |
| C10 | $1.0881946 \times 10^{-14}$ |

Example 5 has the following specifications:

EXAMPLE 5

| SPECIFICATIONS | |
| --- | --- |
| Entrance Pupil Diameter | 2 mm |
| Exit Pupil Diameter: | 40 mm |
| Pupil Magnification PM | 20 |
| Exit Pupil Distance | 160 mm |
| Full Field of View | 61.9° |
| Vertex Length | 719 mm |
| Length Parameter LP | 963 |
| Waveband | Visible (F, d, C) |

In Example #5, PM=20 and LP=963 are both relatively large. Despite this, the front group 508 is still very simple. As in Example #4, an aspheric surface (S#=S3) on lens element 501 is used to control distortion to an acceptably low value.

Figure 26:
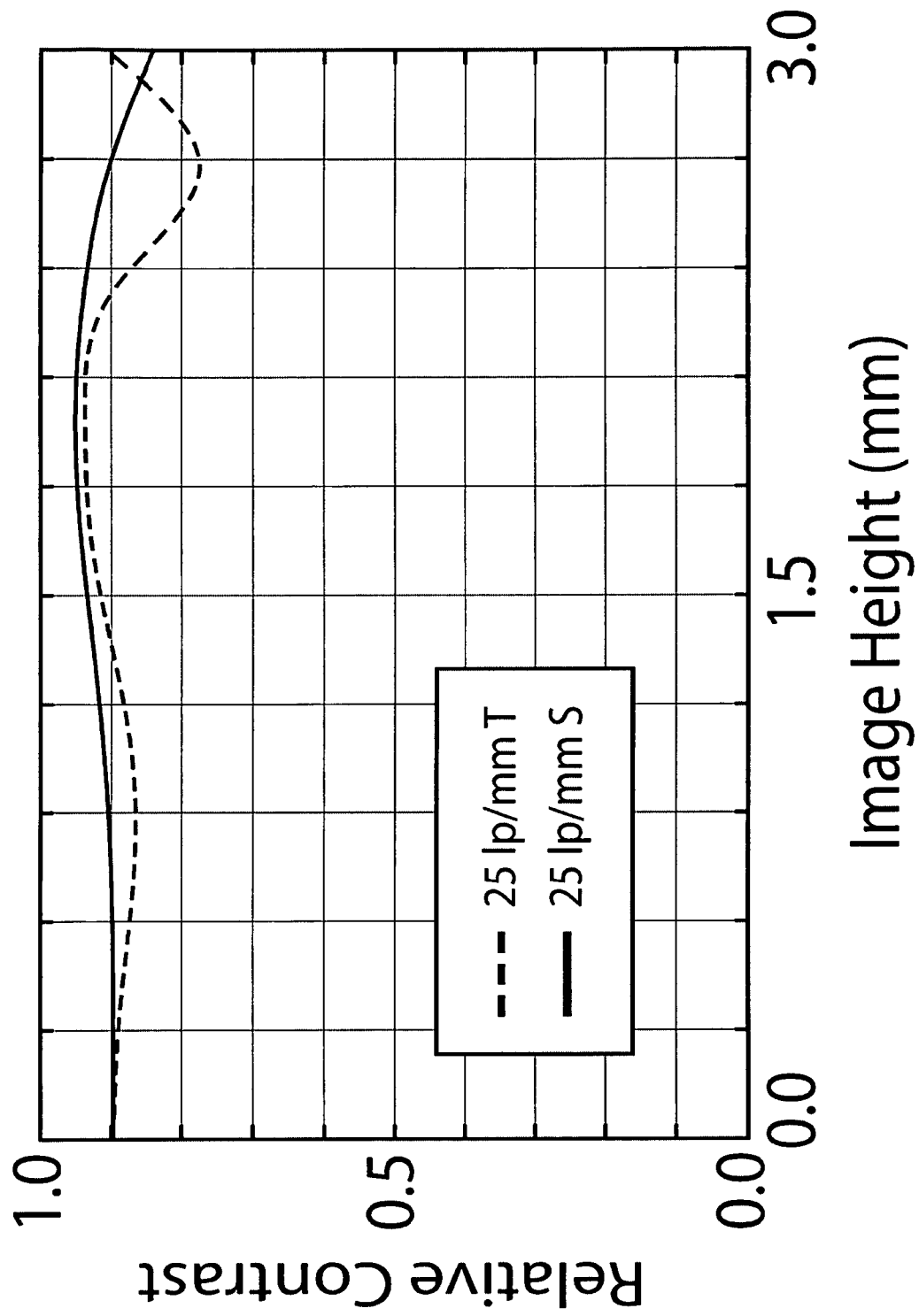
FIG. 26 is a plot of the MTF (relative contrast) vs. image height for 25 line-pairs per millimeter (1 p/mm) for tangential (T) and sagittal (S) rays for Example 5.
Figure 27:
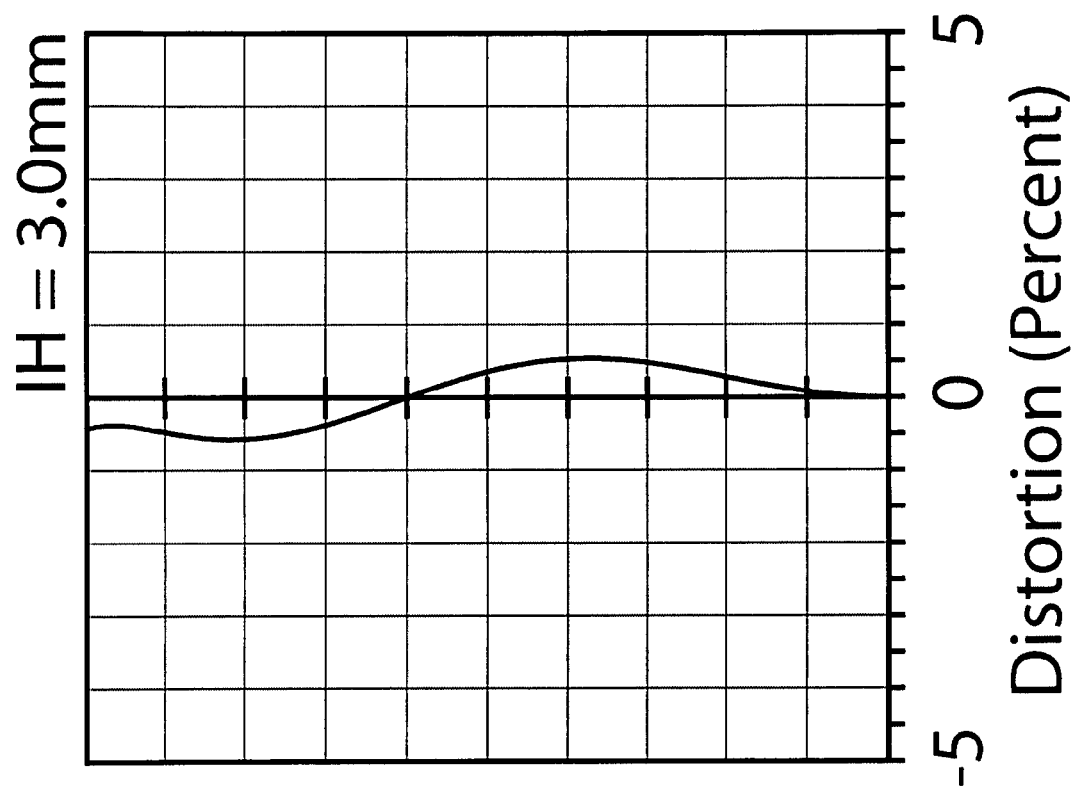
FIG. 27 is a plot of distortion for an image height IH=3 mm for Example 5.

FIG. 26 is a plot of the MTF (relative contrast) vs. image height for 25 line-pairs per millimeter (1 p/mm) for tangential (T) and sagittal (S) rays. FIG. 27 is a plot of distortion for an image height IH=3 mm. Both plots indicate excellent imaging performance.

EXAMPLE 6

Figure 28:
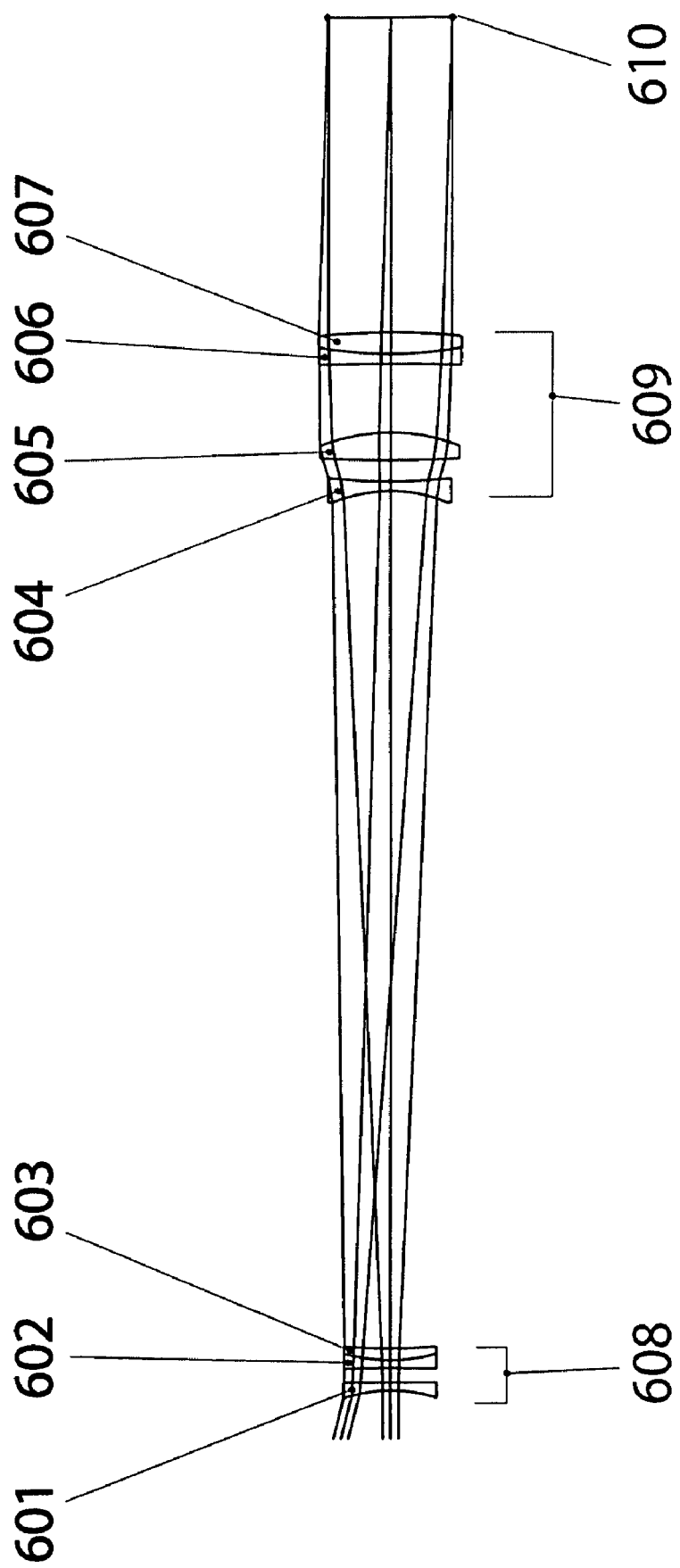
FIG. 28 is a schematic diagram of a sixth example (Example 6) of the afocal attachment of the present invention.

Example 6 of afocal attachment 10 is shown in FIG. 28 and has the following lens prescription:

| LENS DESIGN PRESCRIPTION FOR EXAMPLE 6 | | | | | |
| --- | --- | --- | --- | --- | --- |
| S# | TYPE | R | T | GLASS | DIA |
| OBJ | INF | INF | INF | — | 0 |
| 1 | ST | INF | 25 | — | 43.32528 |
| 2 | ST | −64.03251 | 4 | S-BSM14 | 35.35575 |
| 3 | ASPH | −5087.108 | 7.505806 | | 35.30093 |
| 4 | ST | −481.4665 | 4 | S-BSM14 | 35.19297 |
| 5 | ST | 77.76808 | 6 | S-TIH6 | 35.31797 |
| 6 | ST | 262.3411 | 437.6602 | — | 35.14401 |
| 7 | ST | −69.34656 | 5 | S-BSL7 | 53.04159 |
| 8 | ST | 294.6483 | 10.7904 | — | 56.56423 |
| 9 | ST | 628.3981 | 14 | S-BSM14 | 62.56255 |
| 10 | ST | −87.8117 | 35.0447 | — | 64.77761 |
| 11 | ST | −811.338 | 5 | S-TIM2 | 66.09511 |
| 12 | ST | 190.1571 | 11 | S-BSM14 | 66.53809 |
| 13 | ST | −305.1073 | 160 | — | 66.89365 |
| STO | PAR | — | 100.03 | — | 60 |
| IM | ST | INF | — | — | 4.327156 |

The values for the aspheric parameters for surface S3 are as follows (those parameters not listed have a value of zero):

EXAMPLE 6

ASPHERE VALUES

| PARAMETER | VALUE |
|---|---|
| k | −20.09723 |
| C4 | −7.664269 × $10^{-7}$ |
| C6 | 1.1926043 × $10^{-8}$ |
| C8 | −1.5117601 × $10^{-11}$ |
| C10 | 9.6130549 × $10^{-15}$ |

Example 6 has the following specifications:

EXAMPLE 6

SPECIFICATIONS

| Entrance Pupil Diameter | 7.5 mm |
|---|---|
| Exit Pupil Diameter: | 60 mm |
| Pupil Magnification PM | 8.0 |
| Exit Pupil Distance | 160 mm |
| Full Field of View | 27° |
| Vertex Length | 540 mm |
| Length Parameter LP | 397 |
| Waveband | Visible (F, d, C) |

Example 6 is similar to Example 3, except that 2 waves (i.e., 2λ for λ=588 nm) of overcorrected spherical aberration SA has been intentionally added to the design to improve the depth of field (or depth-of-focus) characteristics and to modify the out-of-focus image rendition qualities. In this Example, it is assumed that in order to appear critically sharp, a defocused image must have a contrast of at least 0.1 at 100 line pairs per millimeter.

Figure 29:
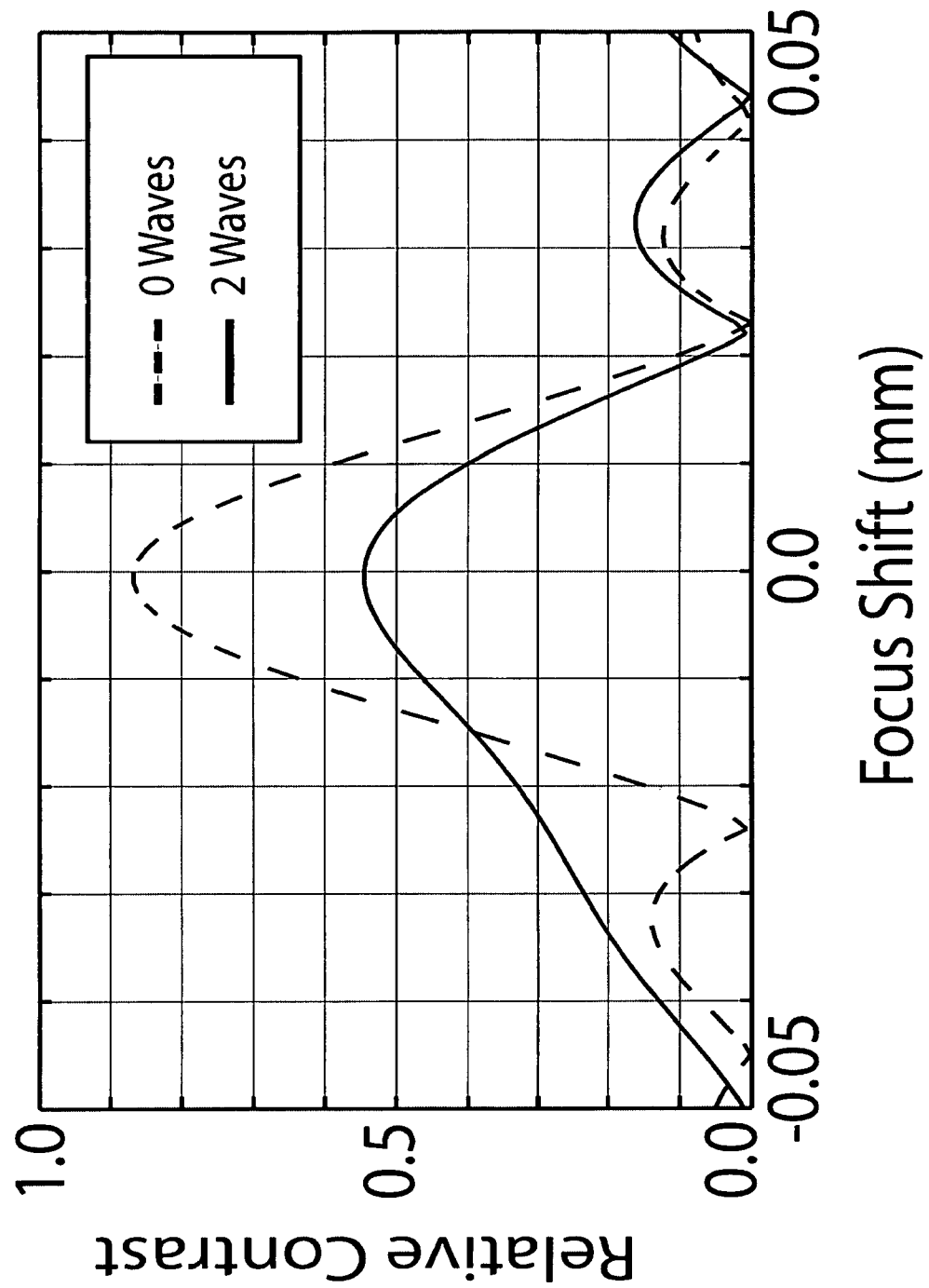
FIG. 29 plots the through-focus MTF curve for Example 6 along with the aberration-free case, illustrating an enhanced depth-of-focus with 2 waves of spherical aberration.

FIG. 29 plots the through-focus MTF curve for Example 6 as compared to an aberration-free version of Example 6. The plot of FIG. 29 shows that the depth of focus in the presence of 2 waves (2λ) of spherical aberration is approximately twice as large in one direction compared to the case of an aberration-free afocal attachment. Example embodiments of afocal attachment 10 include select amounts of spherical aberration ranging from about 0.2 waves to about 2.5 waves. Often, between about 0.7 waves to 1 waves of spherical aberration SA (either under-corrected or overcorrected) is sufficient to substantially enhance the depth-of-focus while keeping the imaging quality (e.g., the MTF) sufficiently high. As one skilled in the art will appreciate, the amount of spherical aberration that is tolerable depends on the specific application for which the afocal attachment 10 is to be used. In certain examples, up to 10 waves of spherical may be employed to obtain a "soft focus" or "portrait" effect.

Figure 30:
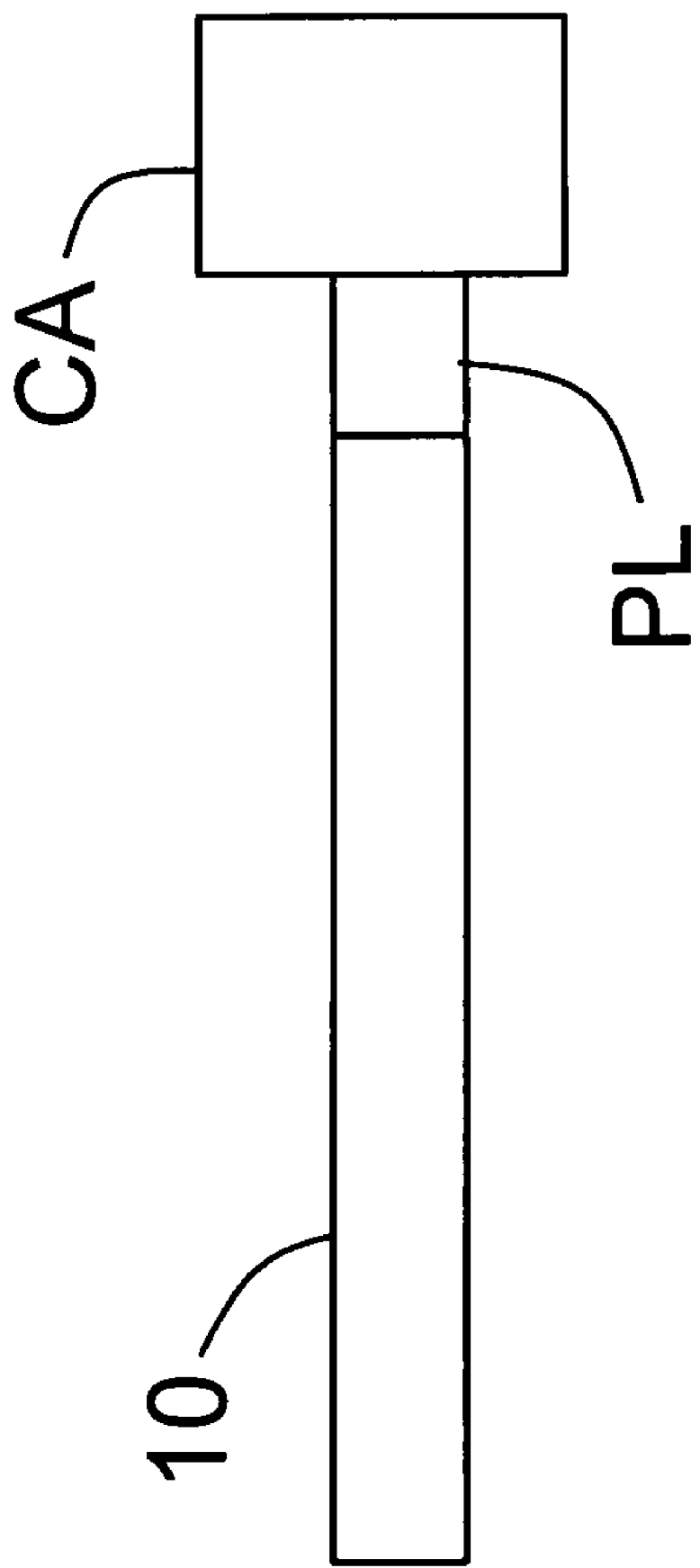
FIG. 30 is a schematic diagram of the afocal attachment as shown operably connected to prime lens PL of a camera CA.

FIG. 30 is a schematic diagram of an imaging system 700, wherein afocal attachment 10 is operably coupled to a prime lens PL of a camera CA.

Large Depth of Field

For a given object distance and circle of confusion, the depth of field is approximately proportional to N/$f^2$, where N is the F/# and f is the focal length, as described in Kingslake, "Optics in Photography," p. 96, published by SPIE 1992. To maximize the depth of field, it is therefore very helpful to use a very short focal length lens. An afocal attachment modifies the focal length of the prime lens PL to which it is attached according to f'=f/PM, where f is the focal length of the prime lens, PM is the pupil magnification of the afocal attachment, and f' is the focal length of the resulting system. Since attachments according to the present invention have a large value for PM, they act to drastically reduce the focal length of the prime lens, which in turn results in a very large depth of field. On a practical level, this allows for objects both near and far from the lens to all be in good focus, which in combination with the access to difficult to reach spaces provided by the extreme length of the attachment, makes for dramatic photographic and cinemagraphic imaging.

It will thus be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An afocal Galilean attachment lens comprising, along an optical axis:
    a first lens group with overall negative optical power;
    a second lens group with overall positive power, and arranged relative to the first lens group to define a Galilean configuration; and
    exit and an entrance pupils having respective diameters $D_{EX}$ and $D_{EN}$ that define a pupil magnification PM=$D_{EX}$/$D_{EN}$>4.

2. The afocal Galilean attachment according to claim 1, wherein PM≧6.

3. The afocal Galilean attachment according to claim 1, wherein PM≧8.

4. The afocal Galilean attachment according to claim 1, wherein PM≧10.

5. The afocal Galilean attachment according to claim 1, wherein:
    the first lens group has a first surface, the second lens group has a last surface, with a vertex length VL defined by the axial distance between the first and last surface;
    an off-axis ray OR1 that enters the system at an angle of 1° from the optical axis and that intersects the front surface at a height H1 from the optical axis and that intersects the last surface SL at the optical axis, so as to define a length parameter LP=|VL/H1|>200.

6. The afocal Galilean attachment according to claim 5, wherein LP>300.

7. The afocal Galilean attachment according to claim 6, wherein LP>500.

8. The afocal Galilean attachment according to claim 7, wherein LP>700.

9. The afocal Galilean attachment according to claim 6, wherein:
    the first lens group has a first surface, the second lens group has a last surface, with a vertex length VL defined by the axial distance between the first and last surface;
    an off-axis ray OR1 that enters the system at an angle of 1° from the optical axis and that intersects the front surface at a height H1 from the optical axis and that intersects the last surface SL at the optical axis, so as to define a length parameter LP=|VL/H1|>300.

10. The afocal Galilean attachment according to claim 2, further including an amount of spherical aberration SA between about 0.2 wave and 2.5 waves at a select imaging wavelength.

11. The afocal Galilean attachment according to claim 10, further including an amount of spherical aberration SA between about 0.7 wave and 1 wave.

12. The afocal Galilean attachment according to claim 1, wherein the first lens group comprises at least one negative meniscus lens element.

13. The afocal Galilean attachment according to claim 12, wherein the second lens group comprises at least one negative lens element and at least one positive lens element.

14. The afocal Galilean attachment according to claim 13, wherein the second lens group consists of two negative lens elements and two positive lens elements.

15. An imaging system, comprising:
a camera having a prime lens; and
the afocal attachment of claim 1 operably coupled to the prime lens.

16. The imaging system of claim 15, wherein the prime lens has a zoom range that includes shorter and longer ends, and wherein the prime lens is arranged closer to the longer end of its zoom range than to the shorter end of its zoom range.

17. An imaging system, comprising:
a camera having a prime lens; and
the afocal attachment of claim 4 operably coupled to the prime lens.

18. An imaging system, comprising:
a camera having a prime lens; and
the afocal attachment of claim 5, operably coupled to the prime lens.

19. An imaging system, comprising:
a camera having a prime lens; and
the afocal attachment of claim 7 operably coupled to the prime lens.

20. An imaging system, comprising:
a camera having a prime lens; and
the afocal attachment of claim 9 operably coupled to the prime lens.

* * * * *